(12) United States Patent
Gibbon et al.

(10) Patent No.: US 8,689,257 B2
(45) Date of Patent: Apr. 1, 2014

(54) METHOD AND SYSTEM FOR CONTENT RECORDING AND INDEXING

(75) Inventors: David Gibbon, Lincroft, NJ (US); Andrea Basso, Marlboro, NJ (US); Lee Begeja, Gillette, NJ (US); Zhu Liu, Marlboro, NJ (US); Bernard S. Renger, New Providence, NJ (US); Behzad Shahraray, Holmdel, NJ (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 614 days.

(21) Appl. No.: 11/967,668

(22) Filed: Dec. 31, 2007

(65) Prior Publication Data
US 2009/0172733 A1   Jul. 2, 2009

(51) Int. Cl.
*G06F 3/00* (2006.01)

(52) U.S. Cl.
USPC ............... 725/41; 725/43; 725/44; 725/53; 725/56

(58) Field of Classification Search
USPC ............................................. 725/49, 55, 59
See application file for complete search history.

(56) References Cited

U.S. PATENT DOCUMENTS

| | | | |
|---|---|---|---|
| 5,940,073 A * | 8/1999 | Klosterman et al. | 715/721 |
| 5,977,964 A * | 11/1999 | Williams et al. | 715/721 |
| 7,117,515 B2 * | 10/2006 | Kim et al. | 725/41 |
| 7,213,256 B1 * | 5/2007 | Kikinis | 725/53 |
| 7,218,635 B2 | 5/2007 | Haddad | |
| 7,266,726 B1 | 9/2007 | Ladd et al. | |
| 7,272,300 B2 | 9/2007 | Srinivasan et al. | |
| 7,292,775 B1 | 11/2007 | Boyle et al. | |
| 7,533,400 B1 * | 5/2009 | Hailey et al. | 725/49 |
| 7,882,522 B2 * | 2/2011 | Neufeld et al. | 725/40 |
| 2002/0042915 A1 * | 4/2002 | Kubischta et al. | 725/38 |
| 2004/0128317 A1 | 7/2004 | Sull et al. | |
| 2004/0205816 A1 * | 10/2004 | Barrett | 725/49 |
| 2004/0220926 A1 | 11/2004 | Lamkin et al. | |
| 2004/0268389 A1 * | 12/2004 | Sezan et al. | 725/35 |
| 2005/0028194 A1 | 2/2005 | Elenbaas et al. | |
| 2005/0160456 A1 | 7/2005 | Moskowitz | |
| 2005/0203927 A1 | 9/2005 | Sull et al. | |
| 2006/0107289 A1 | 5/2006 | DeYonker et al. | |
| 2007/0154168 A1 | 7/2007 | Cordray et al. | |
| 2007/0154169 A1 | 7/2007 | Cordray et al. | |
| 2007/0174774 A1 | 7/2007 | Lerman et al. | |
| 2008/0092173 A1 * | 4/2008 | Shannon et al. | 725/47 |
| 2008/0301732 A1 * | 12/2008 | Archer et al. | 725/40 |
| 2010/0122294 A1 * | 5/2010 | Craner | 725/41 |
| 2010/0153999 A1 * | 6/2010 | Yates | 725/39 |

* cited by examiner

*Primary Examiner* — Chris Parry
(74) *Attorney, Agent, or Firm* — Guntin & Gust, PLC; Douglas Schnabel

(57) ABSTRACT

Methods and systems for content recording and indexing are described. Content may be accessed from a content source. The content may be processed to generate an index of the content. Programming data for future content may be accessed. A content selection guide may be generated in accordance with the index and the programming data. The content selection guide may include a listing of the indexed content and the future content.

16 Claims, 20 Drawing Sheets

METHOD AND SYSTEM FOR CONTENT RECORDING AND INDEXING

FIELD

This application relates to a method and system for content processing, and more specifically to methods and systems for content recording and indexing.

BACKGROUND

A user of a television or other display device seeking content may be limited to receiving content available in real-time or on demand from a content source.

BRIEF DESCRIPTION OF DRAWINGS

Embodiments are illustrated by way of example and not limitation in the figures of the accompanying drawings, in which like references indicate similar elements and in which.

DETAILED DESCRIPTION

Example methods and systems for content recording and indexing are described. In the following description, for purposes of explanation, numerous specific details are set forth in order to provide a thorough understanding of example embodiments. It will be evident, however, to one skilled in the art that the present invention may be practiced without these specific details.

In an example embodiment, content may be accessed from a content source. The content may be processed to generate an index of the content. Programming data for future content may be accessed. A content selection guide may be generated in accordance with the index and the programming data. The content selection guide may include a listing of the indexed content and the future content.

In an example embodiment, a listing portion of a content selection guide may be presented. The listing portion may be associated with a content portion of content. A hierarchical navigation selection may be received for the listing portion. A different listing portion of the content selection guide may be presented in accordance with the hierarchical navigation selection. The different listing portion may be associated with the content portion and including different information regarding the content portion than the listing portion.

In an example embodiment, a content portion of content may be accessed. A topic associated with the content portion may be identified. A visual content representation associated with the content portion of the content may be accessed in accordance with the identifying of the topic. A content selection guide including the visual content representation of the content portion may be provided for presentation.

Figure 1A:
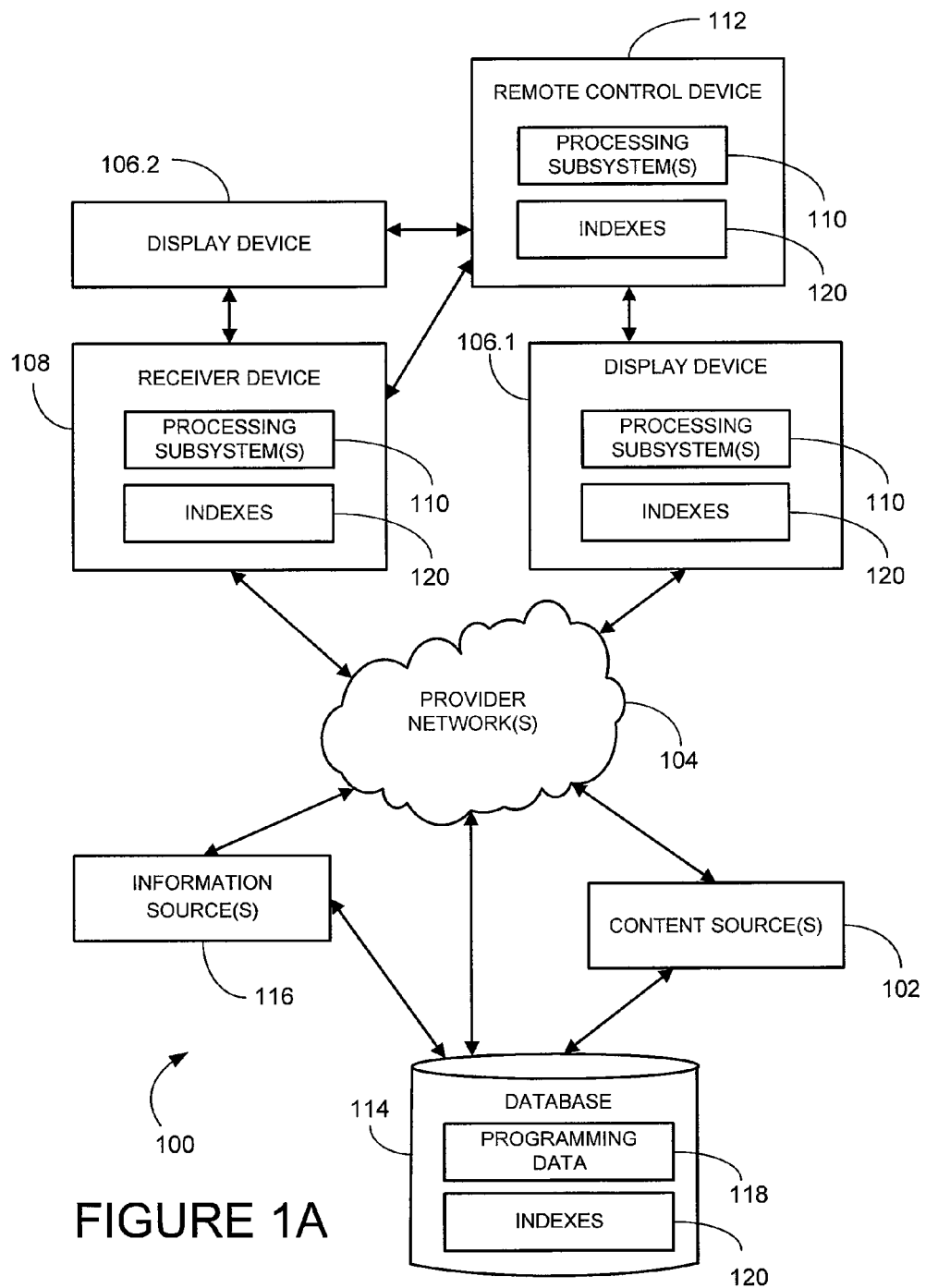
FIGS. 1A and 1B are block diagrams of an example content system according to an example embodiment.

FIG. 1A illustrates an example content system 100. A content source 102 may provide content (e.g., in the form of a video signal) over a provider network 104 to a receiver device 108 and/or a display device 106.1 for presentation. The receiver device 108 and/or the display device 106.1 may include one or more processing subsystems 110 to, by way of example, receive the content from the content source 102, record and index the content, receive programming data regarding future content, generate a content selection guide (e.g., a programming guide) including the indexed content and the future content, and provide a content selection guide for presentation to allow access to the indexed content and future content. An example embodiment of the processing subsystems 110 is described in greater detail below.

The video signal may be a sequence of images and one or more associated audio tracks. The video signal may be a high quality video stream (e.g., MPEG-4) that is transcoded for distribution to the display device 106.1 and/or the receiver device 108. The video signal may include standard definition (SD) or high definition (HD) video signals in NTSC (National Television System Committee), PAL (Phase Alternation Line), SECAM (Systeme Electronique Couleur Avec Memoire), sequence of bitmaps or other signal formats that transport a sequence of images. The form of the video signal may be modified to enable implementations of various formats and resolutions. The video signal may provide a variety of content types including, without limitation, television programs, music, movies, and commercials. The video signal may include Teletext. For example, program insertion (DPI) and/ or or analog cues tones may be included in the video signal.

Other types of content may also be provided by the content source 102. For example, descriptors, thumbnails, and metadata may also be provided by the content source 102.

The provider network 104 may be a television distribution network, Global System for Mobile Communications (GSM) network, an Internet Protocol (IP) network, a Wireless Application Protocol (WAP) network, and/or a WiFi network. Other networks may also be used.

The content source 102 may be a television station (e.g., including a single broadcast channel or a plurality of broadcast channels), a broadcast network, a server, stored content, a digital versatile disc (DVD), or the like. The content source 102 may be a local content source and/or a remote content source.

A single stream or multiple streams of content may be received from one or more content sources 102 and simultaneously processed by the display device 106.1 and/or the receiver device 108.

The display device 106.1, 106.2, may be a television monitor, a mobile telephone, a portable gaming device, a personal digital assistant (PDA), a computer monitor, and the like. Other types of display devices may also be used.

Examples of the receiver device 108 include a set-top box (STB), a receiver card, a mobile telephone, a PDA, and a computing system; however other devices may also be used.

A remote control device 112 may communicate with the display device 106.1, 106.2, and/or the receiver device 108 to control a content portion presented on a visual display of the display device 106.1, 106.2. The remote control device 112 may include one or more processing subsystems 110 instead of or in addition to the processing subsystems 110 of the display device 106.1 and/or the receiver device 108. In an example embodiment, the remote control device 112 may include a visual display on which a content selection guide may be presented to a user.

Programming data regarding future content may be provided from the content source 102 and/or an information source 116. The programming data 118 may include a programming content identification, a programming content highlight, a programming content image, and/or programming content information. The programming data 118 may be stored in a database 114 or otherwise be accessible.

One or more indexes 120 of the content may be stored in the display device 106.1, the receiver device 108, the remote control device 112, and/or the database 114. For example, an index of the display device 106.1, the receiver device 108, the remote control device 112 may be for an individual customer, while the index in the database 118 may be shared by all customers. The indexes 120 may be created by the processing subsystem 110 as described in greater detail below.

Figure 1B:
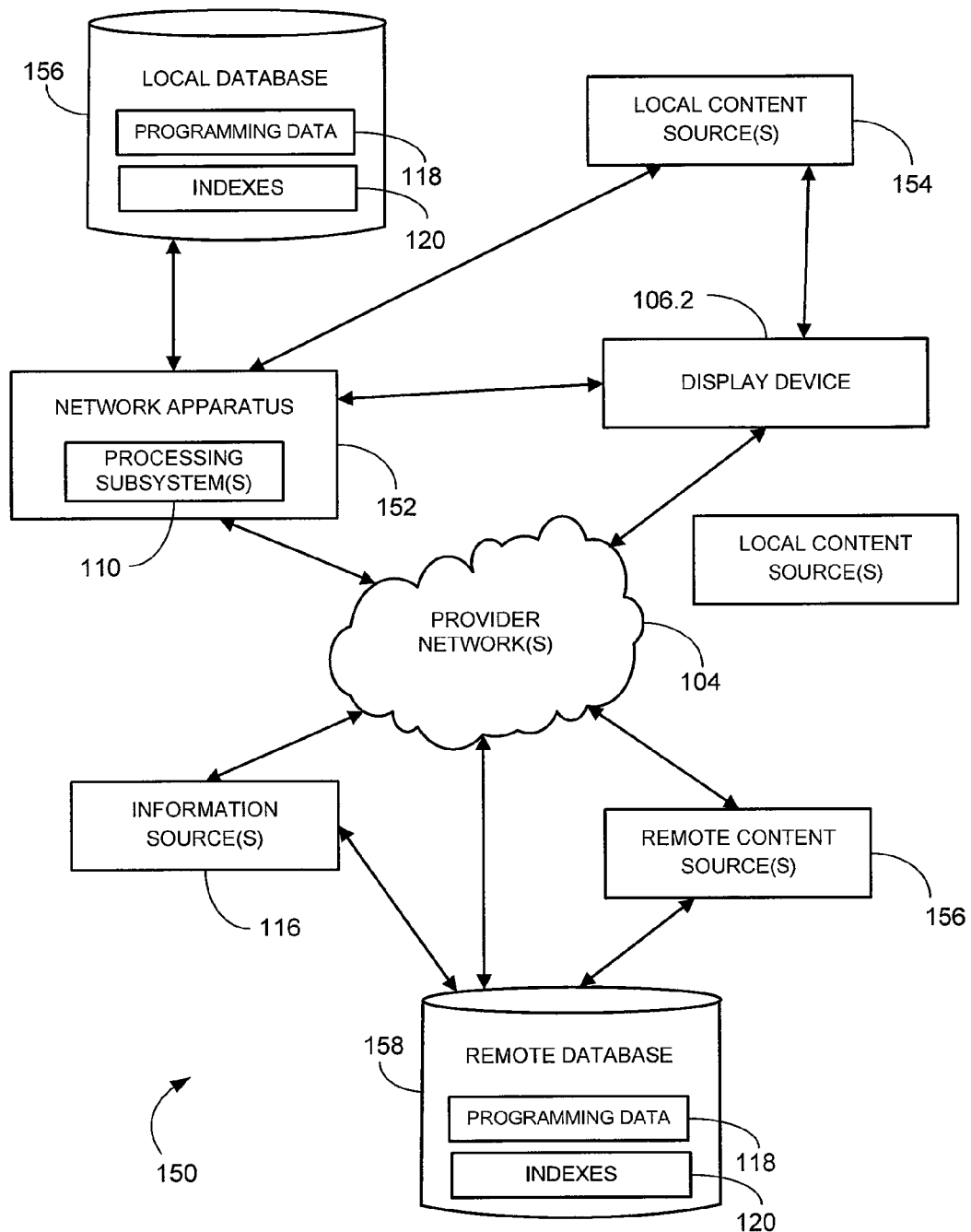

FIG. 1B illustrates an example content system 150 in which the display device 106.2 may receive content from a local content source 154 and/or a remote content source 156. A content selection guide presented on the display device 106.2 may be generated at and received from a network apparatus 152.

The network apparatus 152 may access content from the local content source 154 and the remote content source 156. The content source may also receive and provide the one or more indexes 120 to a local database 156 and/or a remote database 158. The local database 156 and the remote database 158 may also store the programming data 120.

Figure 2:
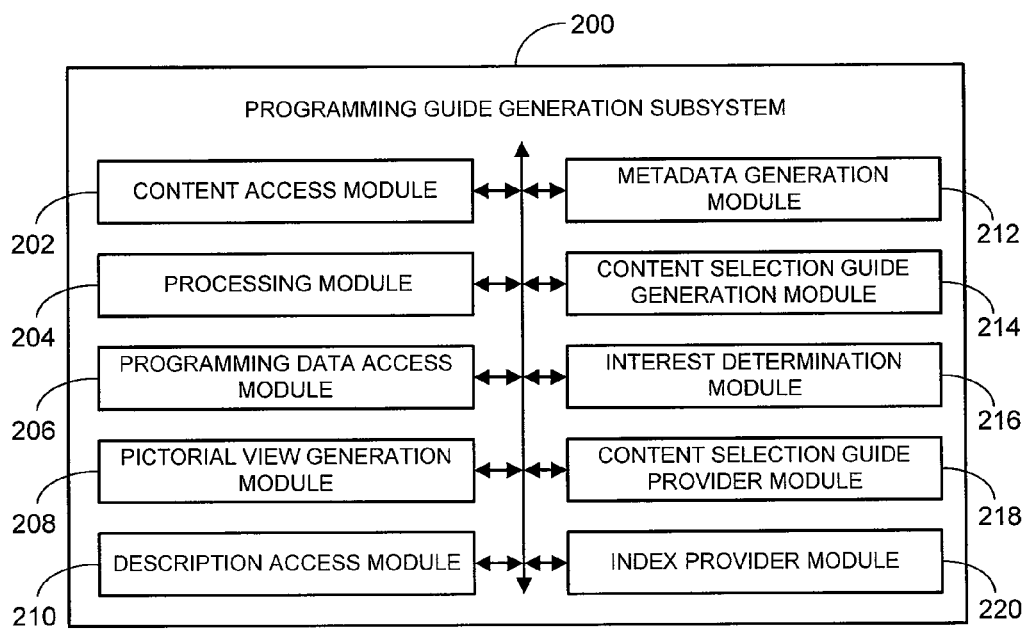
FIG. 2 is a block diagram of an example content selection guide generation subsystem that may be deployed in the content system of FIGS. 1A and 1B according to an example embodiment.

FIG. 2 illustrates an example content selection guide generation subsystem 200 that may be deployed in the receiver device 108, the display device 106.1, and/or the remote control device 112 of the content system 100 as the processing subsystem 110 (see FIG. 1) or otherwise deployed in another system.

The content selection guide generation subsystem 200 may include a content access module 202, an processing module 204, a programming data access module 206, a pictorial view generation module 208, a description access module 210, a metadata generation module 212, a content selection guide generation module 214, an interest determination module 216, a content selection guide provider module 218, and/or an index provider module 220. Other modules may also be used.

The content access module 202 accesses content from the content source 102. The processing module 204 processes the content to generate an index of the content. The programming data access module 206 accesses the programming data 118 for future content.

The pictorial view generation module 208 generates a pictorial view of a content portion of the content. The description access module 210 accesses a description of a content portion. The description may be accessed from closed captioning of the content portion, by processing the content portion with a speech-to-text engine, or otherwise accessed.

The metadata generation module 212 generates metadata for the content accessed from the content source 102. The content selection guide generation module 214 generates a content selection guide in accordance with the index and the programming data 118. The content selection guide may include a pictorial view and/or a description of a content portion. The generated metadata by the metadata generation module 212 may be used during the generating of the content selection guide.

In an example embodiment, the content selection guide may include a listing of the indexed content and the future content. The listing may include, by way of example, program text identifying a program of the indexed content, future program text identifying a future program of the future content, segment text identifying a segment of the program, future segment text identifying a future segment of the future content, program pictorial representation identifying the program, future program pictorial representation identifying the future program, segment pictorial representation identifying the segment, and/or future segment pictorial representation identifying the future segment.

The interest determination module 216 determines one or more interests of a user associated with the content selection guide. The content selection guide provider module 218 module provides the content selection guide for presentation and/or to the remote control device 112. The content selection guide may be provided for presentation to a user in accordance with the determining of the one or more interests or may be otherwise provided. The index provider module 220 provides the index to another device (e.g., the remote control device 112) associated with the same user or a different user on the provider network 104.

Figure 3:
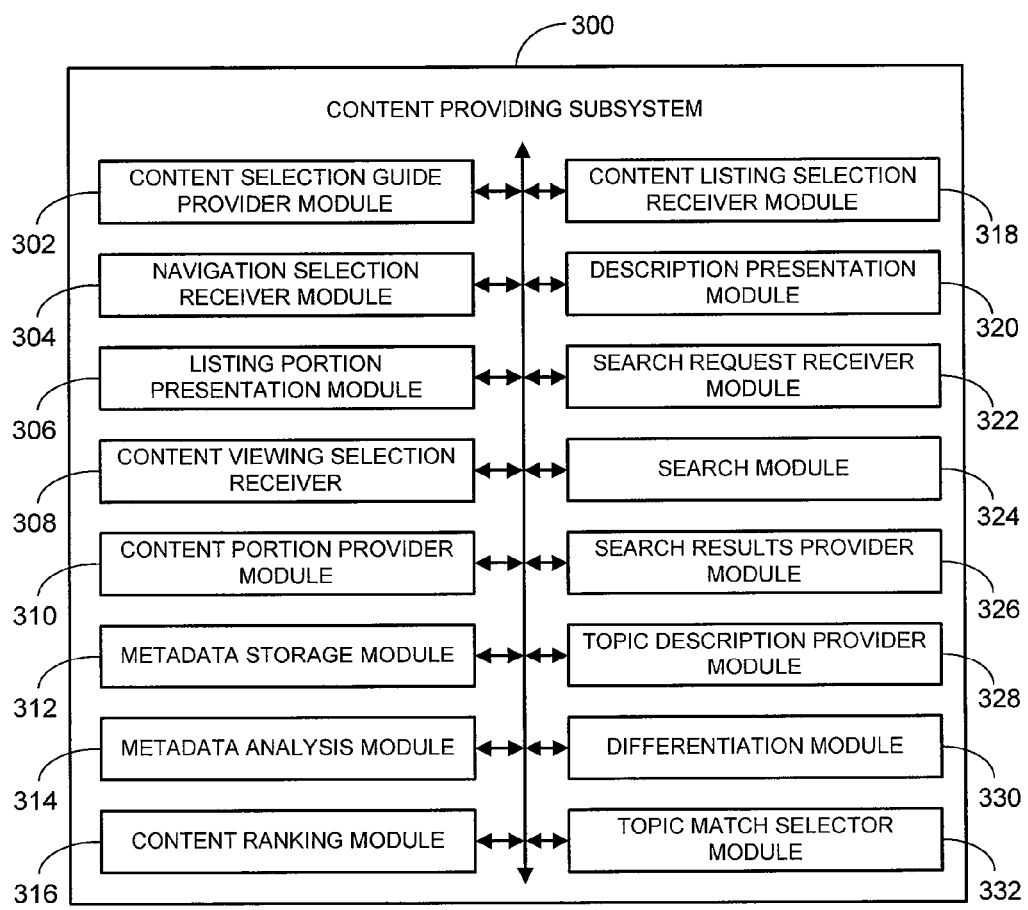
FIG. 3 is a block diagram of an example content providing subsystem that may be deployed in the content system of FIGS. 1A and 1B according to an example embodiment.

FIG. 3 illustrates an example content providing subsystem 300 that may be deployed in the receiver device 108, the display device 106.1, and/or the remote control device 112 of the content system 100 as the processing subsystem 110 (see FIG. 1) or otherwise deployed in another system.

The content providing subsystem 300 may include a content selection guide provider module 302, a navigation selection receiver module 304, a listing portion presentation module 306, a content viewing selection receiver module 308, a content portion provider module 310, a metadata storage module 312, a metadata analysis module 314, a content ranking module 316, a content listing selection receiver module 318, a description presentation module 320, a search request receiver module 322, a search module 324, a search results provider module 326, a topic description provider module 328, a differentiation module 330, and/or a topic match selector module 332. Other modules may also be used.

The content selection guide provider module 302 provides the content selection guide for presentation, to the remote control device 112, to the network apparatus, or to another device on the provider network 104. The navigation selection receiver module 304 receives a navigation selection. The navigation selection may include a scrolling selection or a content selection.

The listing portion presentation module 306 presents a listing portion of the listing and/or a different listing portion of the listing of the content selection guide in accordance with the navigation selection and/or the content selection.

The content viewing selection receiver module 308 receives a content viewing selection. The content portion provider module 310 provides a content portion associated with the content viewing selection and/or a topic match selection for presentation.

The metadata storage module 312 stores metadata associated with the content portion to create a stored metadata portion. The metadata analysis module 314 analyzes stored metadata including the stored metadata portion to determine a content viewing profile.

The content ranking module 316 assigns a content ranking to the content portion in accordance with the content viewing profile. The content listing selection receiver module 318 receives a content listing selection. The description presentation module 320 presents a description associated with the listing portion of the content selection guide.

The search request receiver module 322 receives a search request and/or a time range for the topic. The search module 324 searches the content selection guide in accordance with the search request and/or the time range.

The results provider module 326 provides the search results for presentation. The search results may include a program of the indexed content, a future program of the future content, a segment of the program, a future segment of the future content, a component of the indexed content, or a future component of the future content. Other search results may also be used. For example, the search results may include a number of programs (e.g., episodes of THE TONIGHT SHOW with Jay Leno), a number of future programs (e.g., local nightly news shows), a number of segments (e.g., musical guests on episodes of THE TONIGHT SHOW with Jay Leno), and/or a number of future segments (e.g., trailers of upcoming television shows).

The topic description provider module 328 provides a topic description for associated content with the search results s provided for presentation. The differentiation module 330 differentiates a portion of the topic description provided for presentation that includes the search request. The topic match selector module 332 receives a topic match selection of a topic match.

Figure 4:
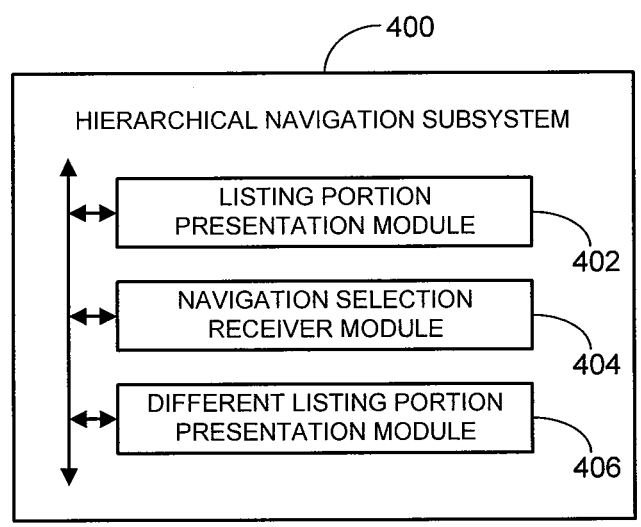
FIG. 4 is a block diagram of an example hierarchical navigation subsystem that may be deployed in the content system of FIGS. 1A and 1B according to an example embodiment.

FIG. 4 illustrates example hierarchical navigation subsystem 400 that may be deployed in the receiver device 108, the display device 106.1, and/or the remote control device 112 of the content system 100 as the processing subsystem 110 (see FIG. 1) or otherwise deployed in another system.

The hierarchical navigation subsystem 400 may include a listing portion presentation module 402, a navigational selection receiver module 404, and/or a different listing portion presentation module 406. Other modules may also be used.

The listing portion presentation module 402 presents a listing portion of a content selection guide. The listing portion may be associated with a content portion of content. The listing portion may include program text identifying the content portion and/or program pictorial representation identifying the content program.

The navigational selection receiver module 404 receives a hierarchical navigation selection for the listing portion. The different listing portion presentation module 406 presents a different listing portion of the content selection guide in accordance with the hierarchical navigation selection. The different listing portion may be associated with the content portion and may include different information regarding the content portion than the listing portion.

The different listing portion may include, by way of example, a synopsis of the content portion, an actor name of an actor associated with the content portion, an actress name of an actress associated with the content portion, a director name of a director associated with the content portion, segment text identifying a segment of the content portion, segment pictorial representation identifying the segment, a guidance rating of the content portion, a teaser, a uniform resource location (URL), a telephone number, a script element, a video call initiation, a click-to-purchase video, environmental data, and/or speech-to-text from the content portion (e.g., generated from the listing). The segment may include a scene of the content portion or a frame of the content portion.

Figure 5:
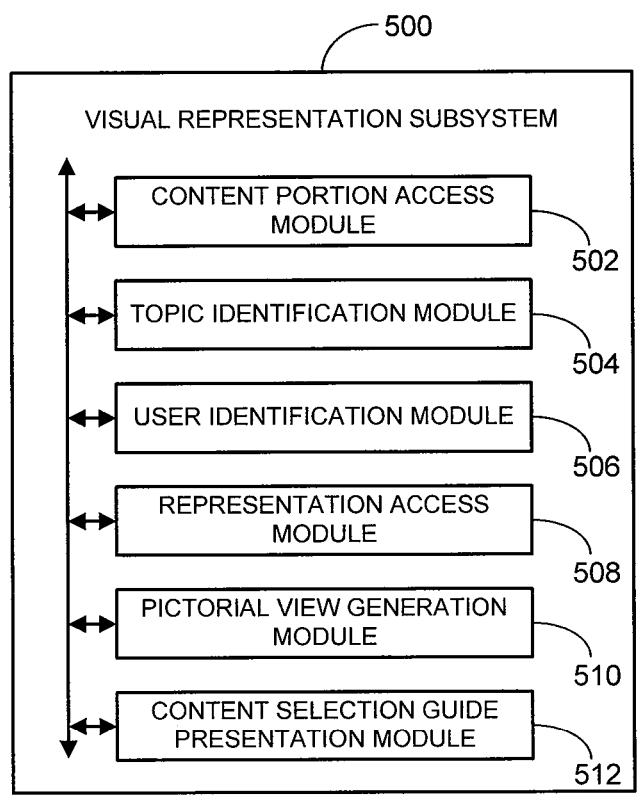
FIG. 5 is a block diagram of an example visual representation subsystem that may be deployed in the content system of FIGS. 1A and 1B according to an example embodiment.

FIG. 5 illustrates example visual representation subsystem 500 that may be deployed in the receiver device 108, the display device 106.1, and/or the remote control device 112 of the content system 100 as the processing subsystem 110 (see FIG. 1) or otherwise deployed in another system.

The visual representation subsystem 500 may include a content portion access module 502, a topic identification module 504, user identification module 506, a representation access module 508, a pictorial view generation module 510, and/or a content selection guide presentation module 512. Other modules may also be used.

The content portion access module 502 accesses a content portion of content. The content portion may be received over the provider network 104 from the content source 102 and/or accessed from storage. The topic identification module 504 identifies a topic associated with the content portion.

The user identification module 506 identifies a user associated with the remote control device 112. The representation access module 508 accesses a visual content representation associated with the content portion of the content in accordance with the identifying of the topic and/or and the user associated with the remote control device 112. The visual content representation of the content portion of the content may be generated in an example embodiment.

The visual content representation may include a textual description and/or a pictorial view. For example, the visual content representation may include a pictorial view associated with a past content portion.

The pictorial view generation module 510 generates a pictorial view of the content portion of the content. The content selection guide presentation module 512 presents a content selection guide including the visual content representation of the content portion and/or the pictorial view of the content portion in place of the visual content representation of the content.

Figure 6:
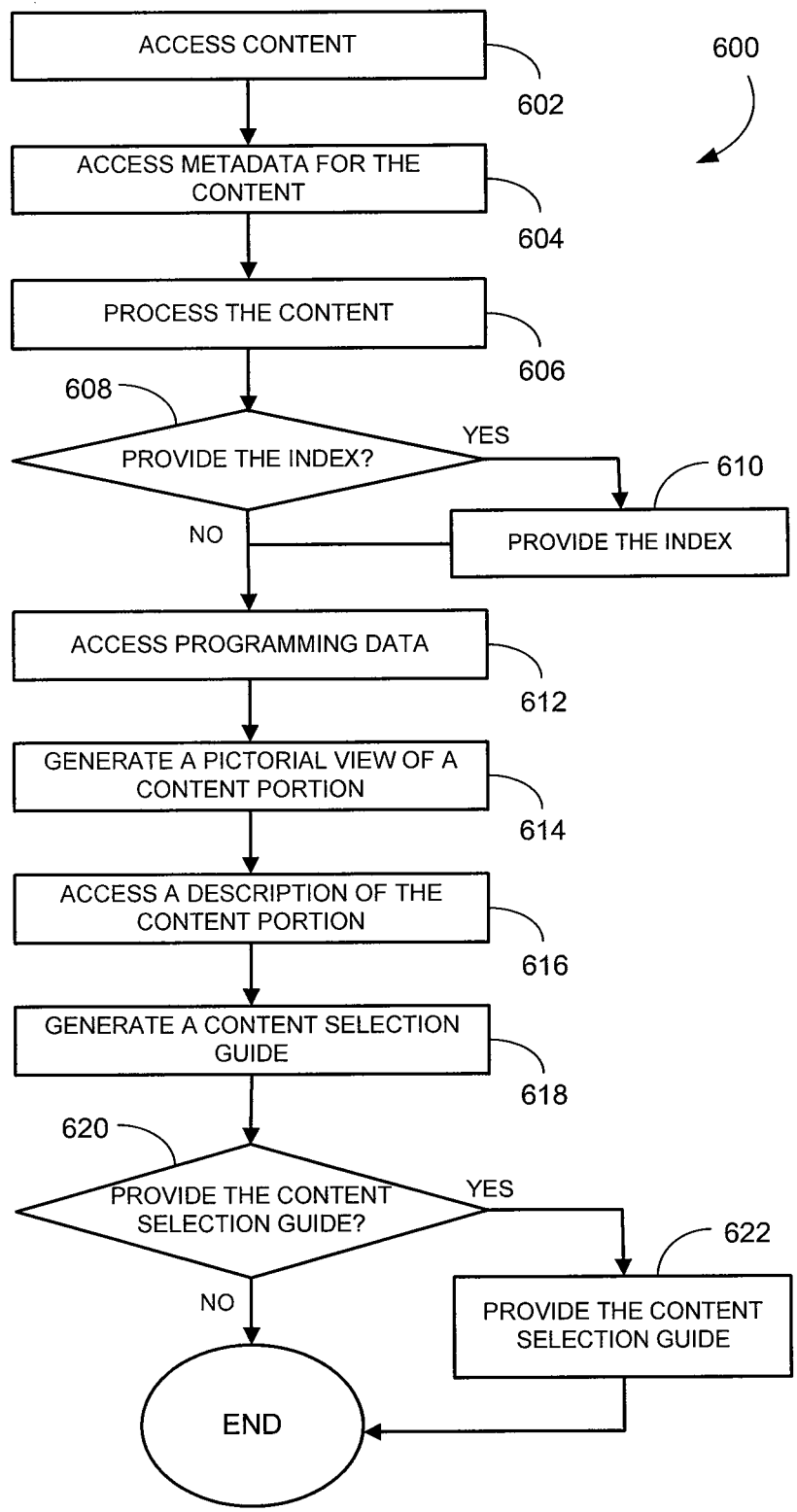
FIG. 6 is a flowchart illustrating a method for program guide generation in accordance with an example embodiment.

FIG. 6 illustrates a method 600 for program guide generation according to an example embodiment. The method 600 may be performed by the display device 106.1, the receiver device 108, and/or the remote control device 112 of the content system 100 (see FIG. 1) or otherwise performed.

Content is accessed at block 602. The content may be accessed from the content source 102, the local content source 154 and/or the remote content sources 156. The content may include past content, current content, and/or future content. For example, the past content may include content that has already been broadcast, the current content may include content that is currently being broadcast, and the future content is content that is scheduled to be broadcast in the future (e.g., a teaser or bonus material for a program to be broadcast in the future). The content may be accessed in real-time or at a delay (e.g., from storage or a digital video recorder).

Metadata may be accessed for the content accessed from the content source 102 at block 604. The metadata may be generated (e.g., on the fly), accessed from the content, accessed from a source of the metadata, or otherwise obtained. The metadata may be generated in accordance with the instantiation target of content selection guide. The instantiation targets may include the display device 106.1, the receiver device 108, the remote control 112, and/or the network apparatus 152.

At block 606, the content is processed to generate an index of the content. The content may be indexed in a time-oriented manner or indexed in a different manner.

At decision block 608, a determination may be made whether to provide the index. If a determination is made to provide the index, the index may be provided to another device (e.g., the remote control device 112 or a receiver device 108 in a different room of a house of the user) on the provider network 104 at block 610. If a determination is made at decision block 608 not to provide the index or upon the completion of the operations at block 610, the method 600 may proceed to block 612.

The programming data 118 is accessed for future content at block 612. The future content may include content or portions thereof that have not been accessed (e.g., in accordance with the operations at block 602).

A pictorial view of a content portion of the content may be generated at block 614. The pictorial view may be generated on the fly or otherwise generated. The pictorial view generated may be based on the device to which the content selection guide will be provided for presentation. For example, the pictorial view may be generated at a lower quality for a mobile device and at a higher quality for a set-top box.

A description of a content portion may be accessed at block 616. The description of the content portion may be accessed by accessing closed captions of the content portion, processing the content portion with a speech-to-text engine, or otherwise accessed.

A content selection guide is generated in accordance with the index and the programming data 118 at block 618. The content selection guide may include a single user interface that utilizes the index, the programming data, and/or the metadata to enable playing and navigating content. The pictorial view of the content portion and/or the description of the content may be included in the content selection guide.

The content selection guide may include a listing of both the indexed content and the future content. The listing may include, by way of example, program text identifying a program of the indexed content, future program text identifying a future program of the future content, segment text identifying a segment of the program, future segment text identifying a future segment of the future content, program pictorial representation identifying the program, future program pictorial representation identifying the future program, segment pictorial representation identifying the segment, and/or future segment pictorial representation identifying the future segment. The listing may be a single, uniform listing containing text and/or pictorial representations of multiple different types from multiple different sources.

In an example embodiment, the generated metadata may also be used to generate the content selection guide during the operations at block 618.

At decision block 620, a determination may be made whether to provide the content selection guide. If a determination is made to provide the content selection guide, the content selection guide may be provided to the remote control device 112, provided for presentation (e.g., directly displayed or provided to a device for display), or otherwise provided at block 622. For example, the content selection guide may be provided for presentation in a time-oriented manner. If a determination is made not to provide the content selection guide at decision block 620 or upon completion of the operations at block 622, the method 600 may terminate.

In an example embodiment, the method 600 may be used to provide a content selection guide with access to a single stream or multiple streams of content. The content may be accessed in real-time or at a delay. For example, multiple streams of content may be continuously and/or simultaneously accessed during the operations at block 602 and may be available for navigation and playback in the content selection guide provided for presentation at block 622.

Figure 7:
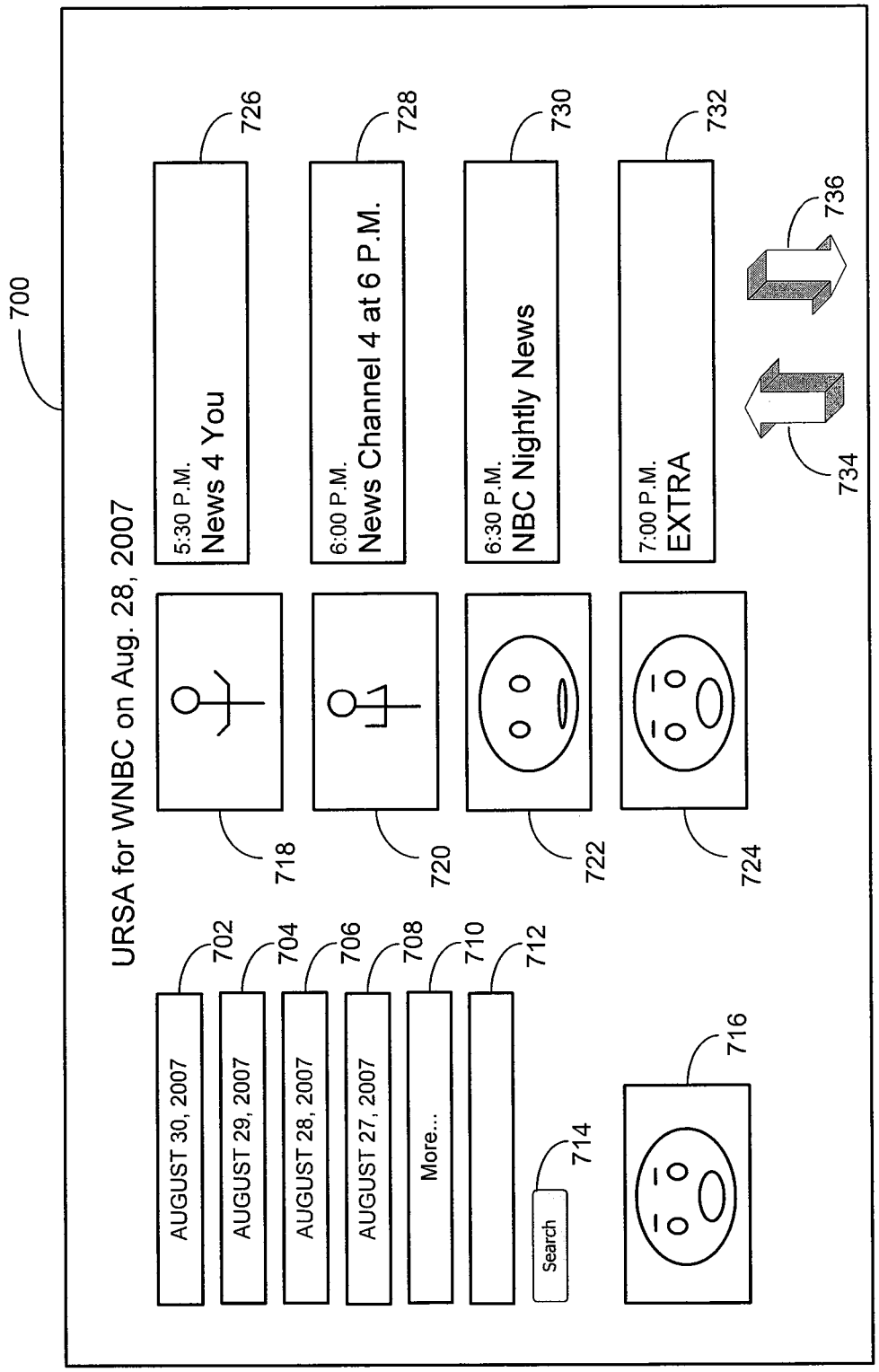
FIG. 7 is a block diagram of an example display in accordance with an example embodiment.

FIG. 7 is a block diagram of an example display 700 of a listing portion of a content selection guide according to an example embodiment. The display 700 may be presented on the display device 106.1, 106.2, the remote control device 112, or may be otherwise presented. In an example embodiment, the display 700 may be presented to a user when the listing portion of the content selection guide is selected. For example, the display 700 may be presented to a user during the operations at block 622 (see FIG. 6).

A number of available date selections 702-708 may be associated with available content and available to a user. In addition, additional dates may be also be available to a user by selecting the more selection 710. A user may search for available content through search field 712 and a search selection 714.

A current content window 716 may display an image or video of content currently selected for presentation. Additional content windows 718-724 may include an image or video of available content available for selection. Display text 726-732 may be associated with the additional content windows 718-724 to provide information regarding the content portion associated with the additional content windows 718-724. For example, the information may include a time at which a program was broadcast, the name of the program, and the like.

Navigation controls 734, 736 may enable a user to be provided with different content portions in the additional content windows 718-724. While the navigation controls 734, 736 are shown in the display 700 as arrows, other types of navigation controls may also be used.

Figure 8:
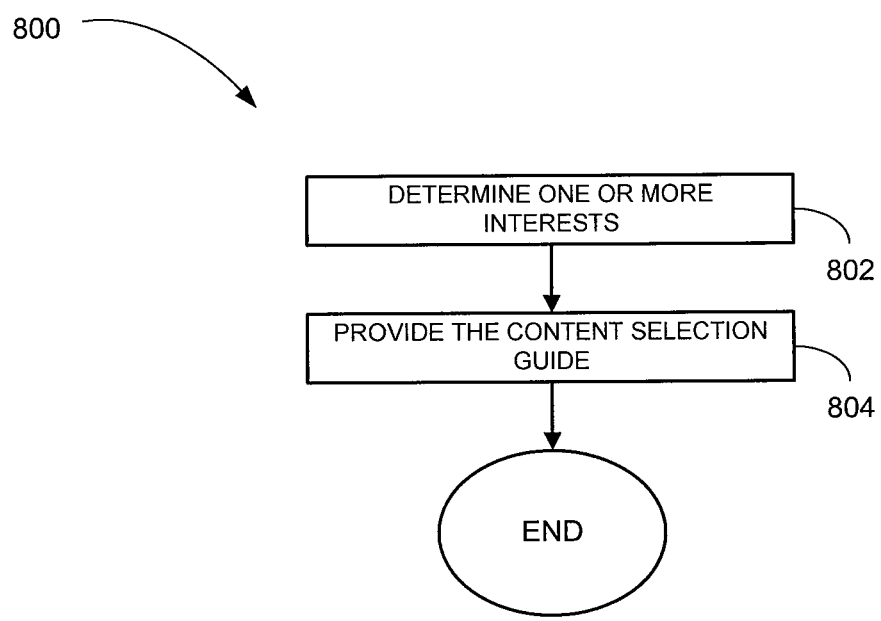
FIGS. 8 and 9 are flowcharts illustrating a method for providing a content selection guide in accordance with an example embodiment.

FIG. 8 illustrates a method 800 for providing a content selection guide according to an example embodiment. The method 800 may be performed at block 622 (see FIG. 6) or otherwise performed. In an example embodiment, the method 800 may be used to tailor a content selection guide for a particular user.

One or more interests of a user associated with the content selection guide are determined at block 802. The determination of the interests may be based on collected usage statistics of the user. The usage statistics may be based on selections made by the user with the content selection guide. The determination may change with the age of the user and/or may be refined over time based on additional usage statistics.

The content selection guide is provided for presentation in accordance with the determining of the one or more interests at block 804.

In an example embodiment, the one or more interests of the user may be reevaluated and the content selection guide may again be provided for presentation instead of the previously provided content selection guide.

Figure 9:
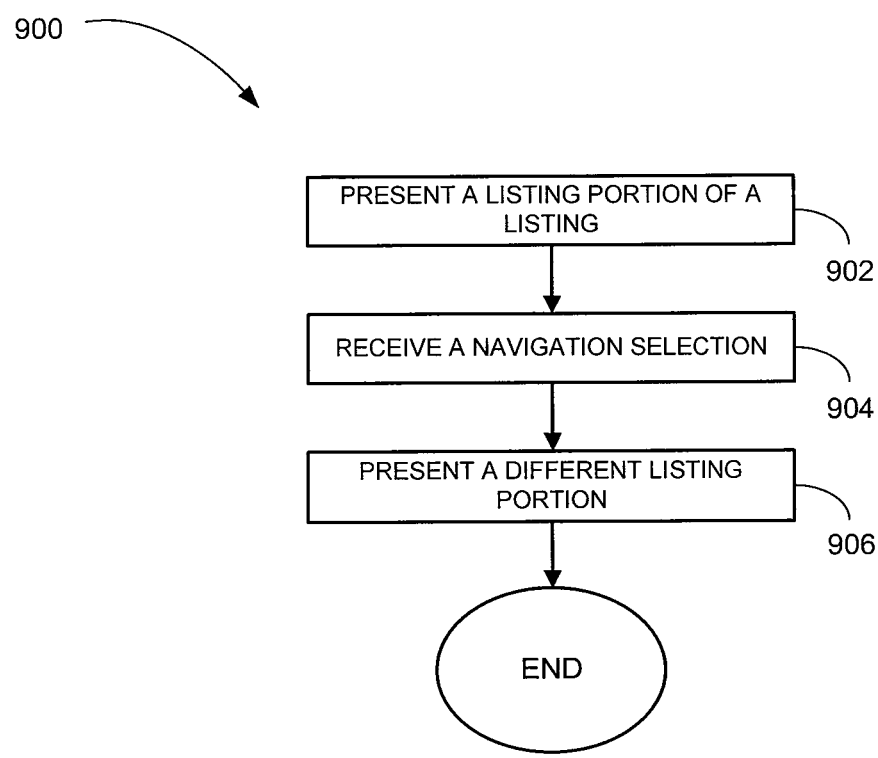

FIG. 9 illustrates a method 900 for providing a content selection guide according to an example embodiment. The method 900 may be performed at block 622 (see FIG. 6) or otherwise performed. In an example embodiment, the method 900 may be used to browse available content in the content selection guide.

A listing portion of the listing of the content selection guide is presented at block 902. The listing portion may include available content for selection. An example embodiment of the listing portion is shown in display 700 (see FIG. 7).

A navigation selection for the content selection guide is received at block 904. The navigation selection may be a request by a user to view other content selection than those presented by the listing portion. The navigation selection may include a scrolling selection, a content selection, or the like.

At block 906, a different listing portion of the listing is presented in accordance with the navigation selection. The different listing portion may include different content available for selection than the listing portion.

Figure 10:
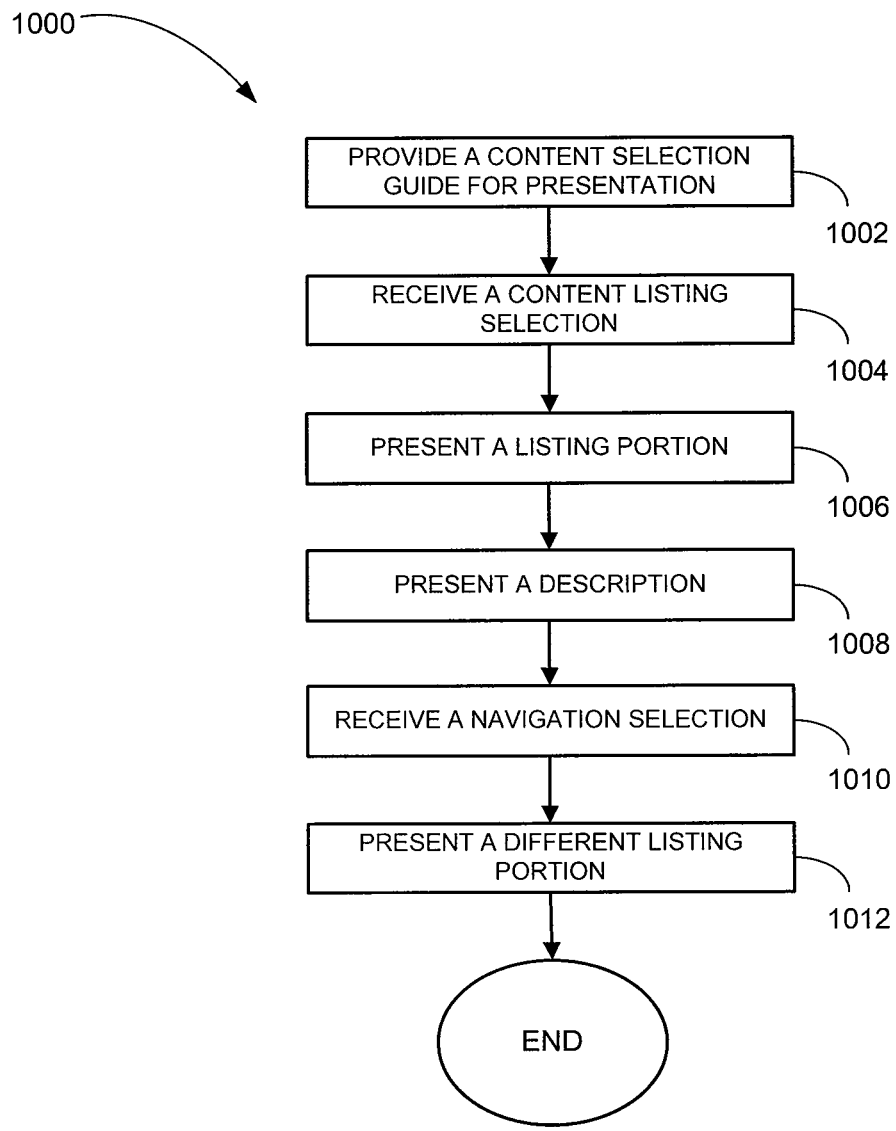
FIG. 10 is a flowchart illustrating a method for utilizing a content selection guide in accordance with an example embodiment.

FIG. 10 illustrates a method 1000 for utilizing a content selection guide according to an example embodiment. In an example embodiment, the method 1000 may be used to navigate in the content selection guide. The method 1000 may be performed by the display device 106.1, the receiver device 108, and/or the remote control device 112 of the content system 100 (see FIG. 1) or otherwise performed.

The content selection guide may be provided for presentation at block 1002. The content selection guide may be presented on a visual display of the display device 106.1, 106.2, the receiver device 108, and/or the remote control device 112. The content selection guide may also be otherwise displayed.

A content listing selection is received at block 1004. The content listing selection may be to provide a listing of content available from a particular content source 102 (e.g., a television channel).

A listing portion of the content selection guide associated with the content selection is presented at block 1006. The listing portion may include indexed content and future content.

A description associated with the listing portion of the content selection guide may be provided at block 1008. The description may provide information regarding a content portion identified in the listing portion. For example, the information may include identification of the content source 102, airtime of the content portion, length of the content portion, and the like.

A navigation selection may be received at block 1010. A different listing portion of the content selection guide associated with the navigation selection may be presented at block 1012. The operations performed at block 1010 and block 1012 may enable the user to navigate through multiple different listing portions of the content selection guide.

Figure 11:
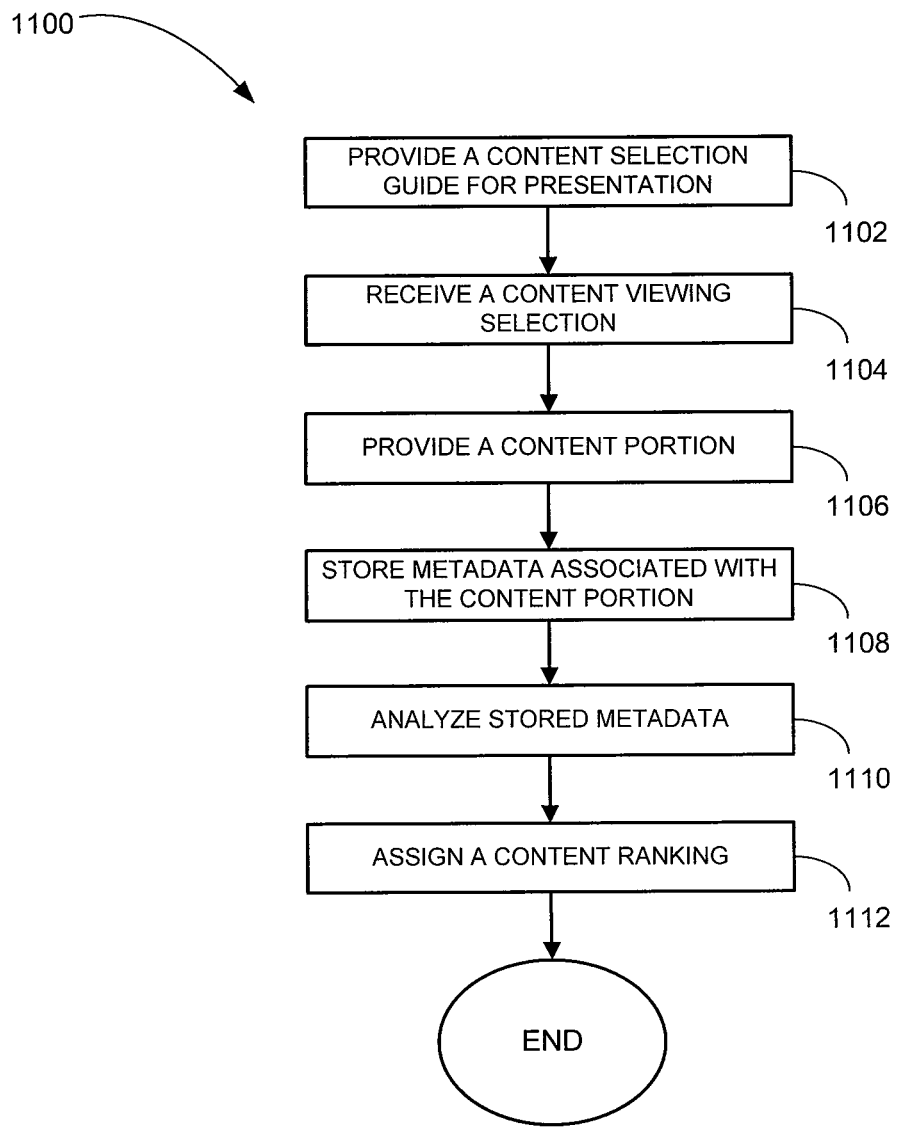
FIGS. 11 and 12 are flowcharts illustrating a method for utilizing a content selection guide in accordance with an example embodiment.

FIG. 11 illustrates a method 1100 for utilizing a content selection guide according to an example embodiment. In an example embodiment, the method 1100 may be used to view a content portion identified in the content selection guide. The method 1100 may be performed by the display device 106.1, the receiver device 108, and/or the remote control device 112 of the content system 100 (see FIG. 1) or otherwise performed.

The content selection guide may be provided for presentation at block 1102. The content selection guide may be presented on a visual display of the display device 106.1, 106.2, the receiver device 108, and/or the remote control device 112. The content selection guide may also be otherwise displayed.

In an example embodiment, the content selection guide may be presented in accordance with a content viewing profile and/or a content ranking. The content viewing profile may include the viewing habits of a particular user and/or multiple users of a particular device. The content ranking may be an interest expressed implicitly or explicitly in a content portion, for example, by a particular user and/or multiple users on a particular device.

A content viewing selection is received at block 1104. The content viewing selection may be of a content portion available on a listing portion of the content selection guide. At block 1106, a content portion associated with the content viewing selection for presentation is received.

Metadata associated with the content portion may be stored to create a stored metadata portion at block 1108. At block 1110, the stored metadata may be analyzed to determine the content viewing profile. The stored metadata may include the stored metadata portion.

The content ranking may be assigned to the content portion in accordance with the content viewing profile at block 1112.

Figure 12:
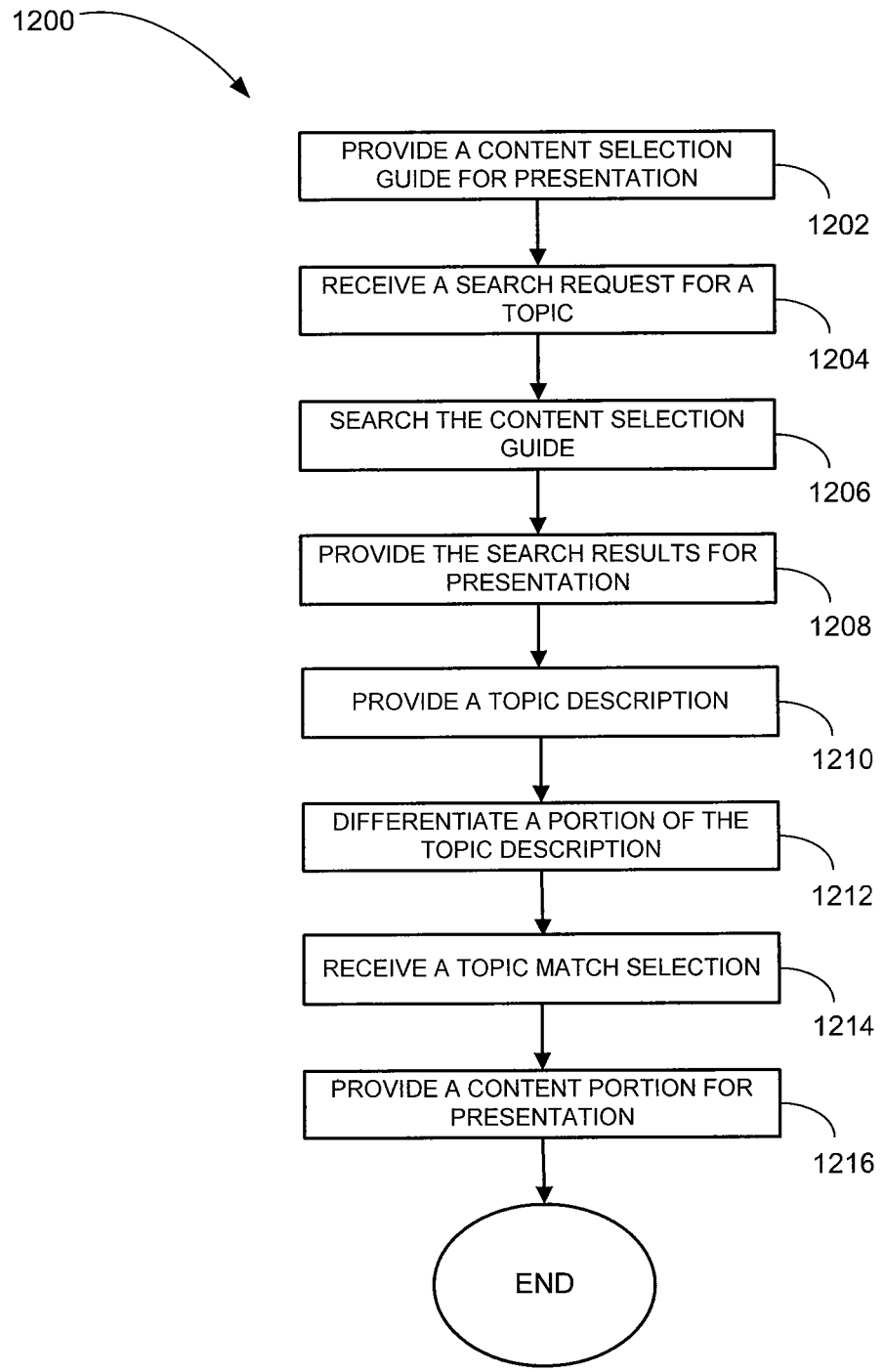

FIG. 12 illustrates a method 1200 for utilizing a content selection guide according to an example embodiment. In an example embodiment, the method 1200 may be used to search using the content selection guide. The method 1200 may be performed by the display device 106.1, the receiver device 108, and/or the remote control device 112 of the content system 100 (see FIG. 1) or otherwise performed.

The content selection guide may be provided for presentation at block 1202. The content selection guide may be presented on a visual display of the display device 106.1, 106.2, the receiver device 108, and/or the remote control device 112. The content selection guide may also be otherwise displayed.

A search request is received at block 1204. The search request may include text (e.g., a search string) and/or an image. For example, the search may include a request for a topic, a title, a date, a time, or the like.

At block 1206, the indexed content, the programming data and/or the metadata is searched in accordance with the search request. The search may also be based on the user for whom the search is being performed. The matches may be associated with a program of the indexed content, a future program of the future content, a segment of the program, and/or a future segment of the future content.

The search results are provided for presentation at block 1208. The search results may be provided for presentation through the content selection guide or otherwise provided.

At block 1210, a topic description may be provided for associated content with the search results provided for presentation. A portion of the topic description provided for presentation that includes the search request may be differentiated at block 1212. For example, the portion may be highlighted, bolded, or otherwise differentiated.

A topic match selection of a topic match may be received at block 1214. The content portion associated with the topic match may then be provided for presentation at block 1216.

Figure 13:
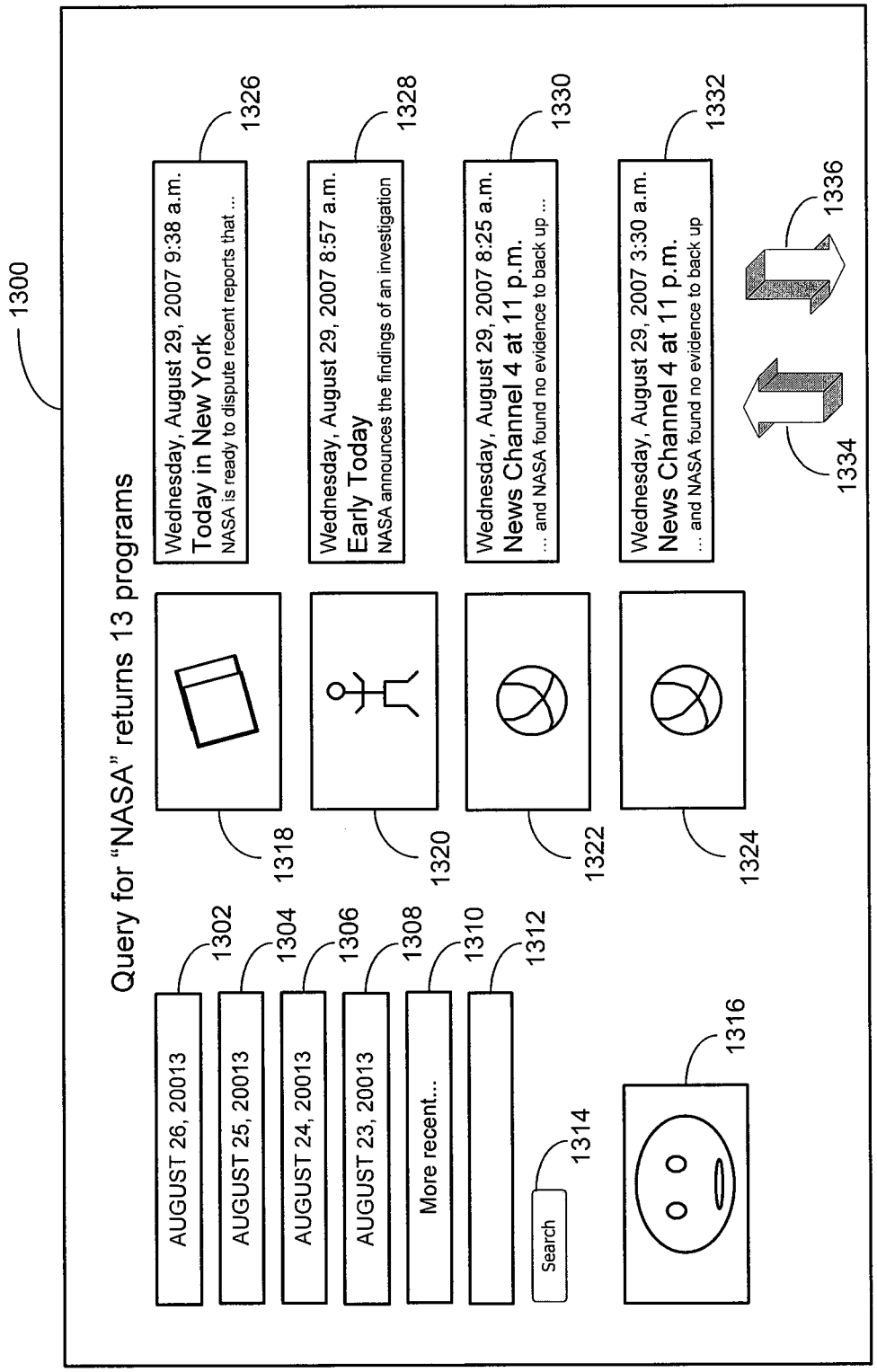
FIG. 13 is a is a block diagram of an example display in accordance with an example embodiment.

FIG. 13 is a block diagram of an example display 1300 of a listing portion of a content selection guide according to an example embodiment. In an example embodiment, the listing portion presented in the display 1300 may be in response to a search request. The display 1300 may be presented on the display device 106.1, 106.2, the remote control device 112, or may be otherwise presented.

A number of available date selections 1302-1308 may be associated with available content and available to a user. Recent content may also be available to a user by selecting a more recent selection 1310. A user may make a new search query for content through search field 1312 and a search selection 1314.

A current content window 1316 may display an image or video of content currently selected for presentation. Additional content windows 1318-1324 may include an image or video of other search results (e.g., topic matches) available for selection. Display text 1326-1332 may be associated with the additional content windows 1318-1324 to provide information regarding the search results associated with the additional content windows 1318-1324. For example, the information may include a time at which a program is available, the name of the program, a line of text from a content program, and the like.

Navigation controls 1334, 1336 may enable a user to be provided with further search results in the additional content windows 1318-1324. While the navigation controls 1334, 1336 are shown in the display 1300 as arrows, other types of navigation controls may also be used.

Figure 14:
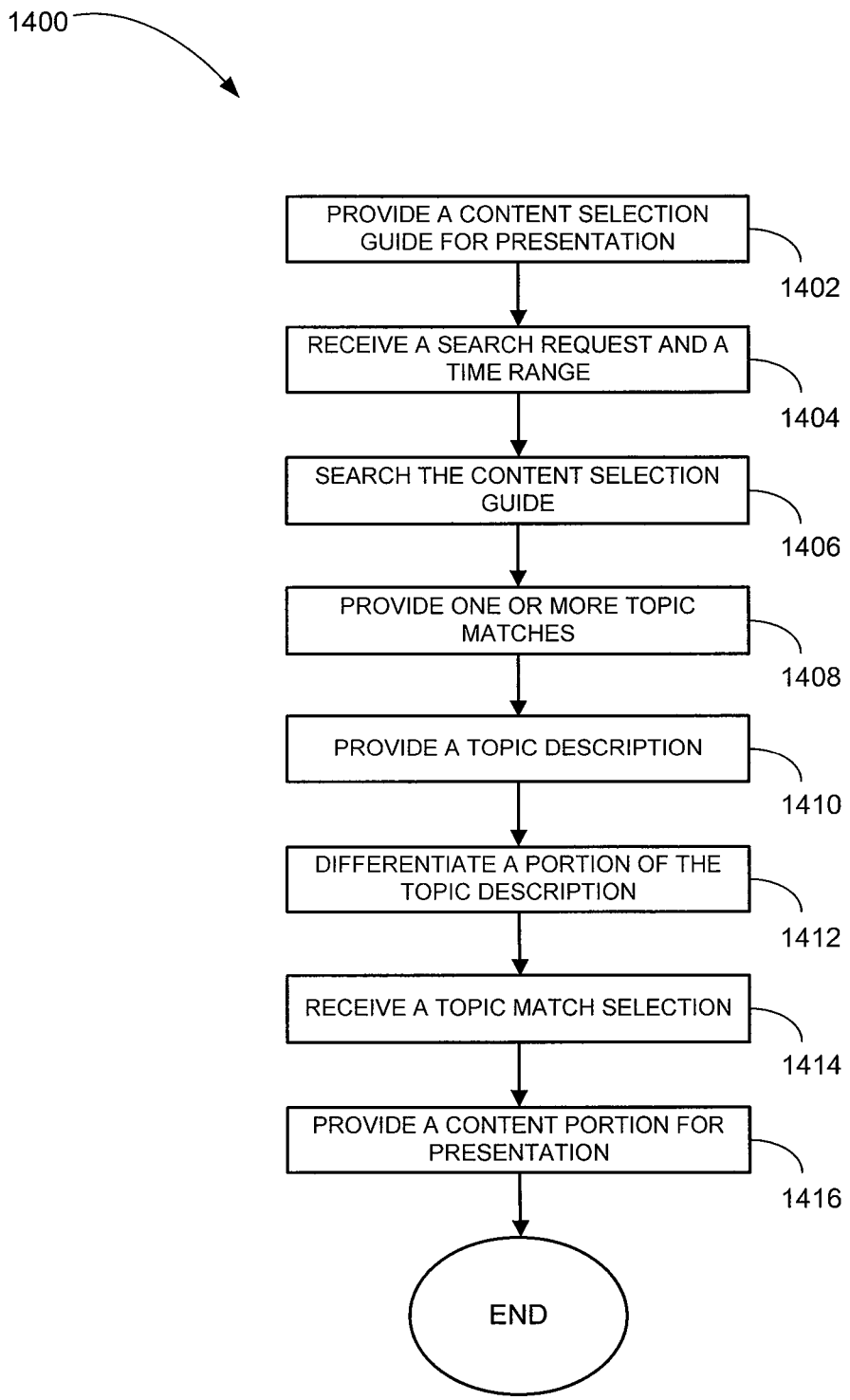
FIG. 14 is a flowchart illustrating a method for utilizing a content selection guide in accordance with an example embodiment.

FIG. 14 illustrates a method 1400 for utilizing a content selection guide according to an example embodiment. The method 1400 may be performed by the display device 106.1, the receiver device 108, and/or the remote control device 112 of the content system 100 (see FIG. 1) or otherwise performed.

The content selection guide may be provided for presentation at block 1402. The content selection guide may be presented on a visual display of the display device 106.1, 106.2, the receiver device 108, and/or the remote control device 112. The content selection guide may also be otherwise displayed.

A search request and a time range for a topic is received at block 1404. The time range may designate the search for the topic to a designated period of time.

The content selection guide is searched for one or more topic matches in accordance with the search request and the time range at block 1406.

One or more topic matches are provided for presentation at block 1408. The topic matches may be provided for presentation through the content selection guide or otherwise provided.

At block 1410, a topic description may be provided for associated content with the one or more topic matches provided for presentation. A portion of the topic description provided for presentation that includes the search request may be differentiated at block 1412.

A topic match selection of a topic match may be received at block 1414. The content portion associated with the topic match may then be provided for presentation at block 1416.

Figure 15:
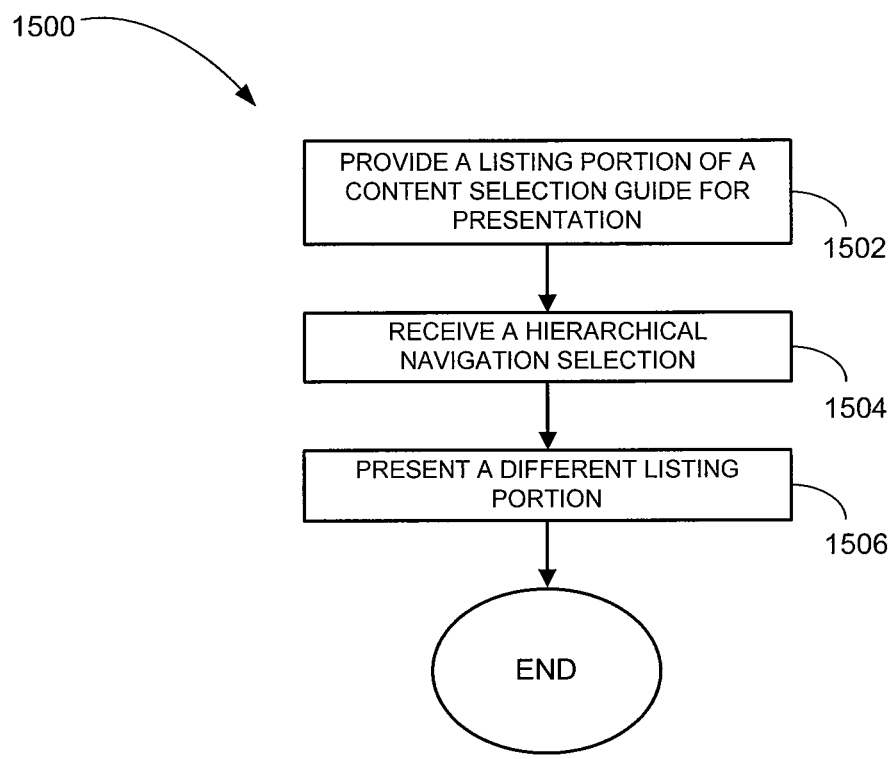
FIG. 15 is a flowchart illustrating a method for navigating a content selection guide in accordance with an example embodiment.

FIG. 15 illustrates a method 1500 for navigating a content selection guide according to an example embodiment. The method 1500 may be performed by the display device 106.1, the receiver device 108, and/or the remote control device 112 of the content system 100 (see FIG. 1) or otherwise performed.

A listing portion of a content selection guide is presented at block 1502. The listing portion may be associated with one or more content portions of content. The listing portion may include, by way of example, program text identifying the content portion and/or program pictorial representation identifying the content program.

A hierarchical navigation selection for the listing portion is received at block 1504. The hierarchical navigation selection may seek a greater level of detail or lesser level of detail regarding a particular content portion.

At block 1506, a different listing portion of the content selection guide is presented in accordance with the hierarchical navigation selection. The different listing portion may be associated with the content portion. The different listing portion may include different information regarding the content portion than the listing portion.

The different listing portion may include a synopsis of the content portion, an actor name of an actor associated with the content portion, an actress name of an actress associated with the content portion, a director name of a director associated with the content portion, component text identifying a component of the content portion, component pictorial representation identifying the component, and/or a guidance rating of the content portion. Other different listing portions may also be used. The segment may include a scene of the content portion or a frame of the content portion.

The segment may consist of multiple components. The components are content aspects that may be from the content source 102, 154, 156. For example, a segment may include a first component (e.g., video) from a first content source, a second component (e.g., audio) from a second content source, and a third component (e.g., metadata) from a third content source.

Figure 16:
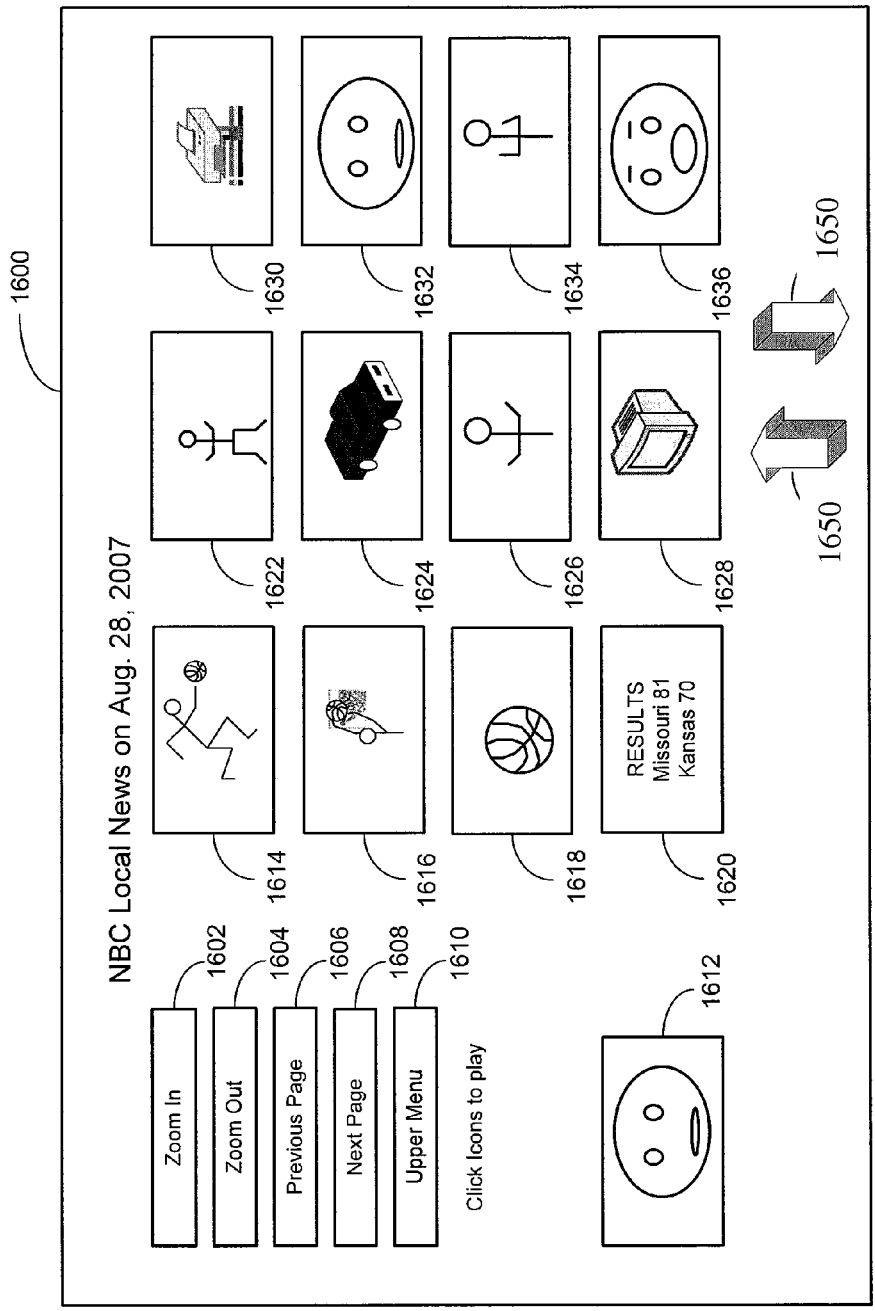
FIG. 16 is a block diagram of an example display in accordance with an example embodiment.

FIG. 16 is a block diagram of an example display 1600 of a different listing portion according to an example embodiment. The display 1600 may be presented on the display device 106.1, 106.2, the remote control device 112, or may be otherwise presented. In an example embodiment, the display 1600 may be presented in response to a hierarchical navigation request. Display 1600 can include navigation controls 1650.

A number of available content selections 1602-1608, 1634, 1636 may be associated with available content that is available to a user. A user may select a greater level of detail for a particular content selection by selecting a zoom in selection 1602 or a lesser level of detail for a particular content selection by selection a zoom out selection 1604. The user may use a previous page selection 1606, 1634 and/or a next page selection to view different frames from the content selection at the same level of detail earlier or later in time. The user may select a top level of a menu (e.g., a programming listing page) for the content selection guide by selecting the upper menu selection 1610.

A content window 1612 may display an image or video of content currently being provided for presentation. The additional content windows 1614-1636 may include an image or video at the same level of detail that are available for selection. The level of detail provided in the additional content windows 1614-1636 may be reflected based on the keyframes of the content that are provided for presentation. For example, if a 30 minute program contains one thousand keyframes, a greatest level of detail of the content may be to show individual keyframes pages after pages, while the lowest level of detail may be to show only nine keyframes sampled across the one thousand total keyframes.

Figure 17:
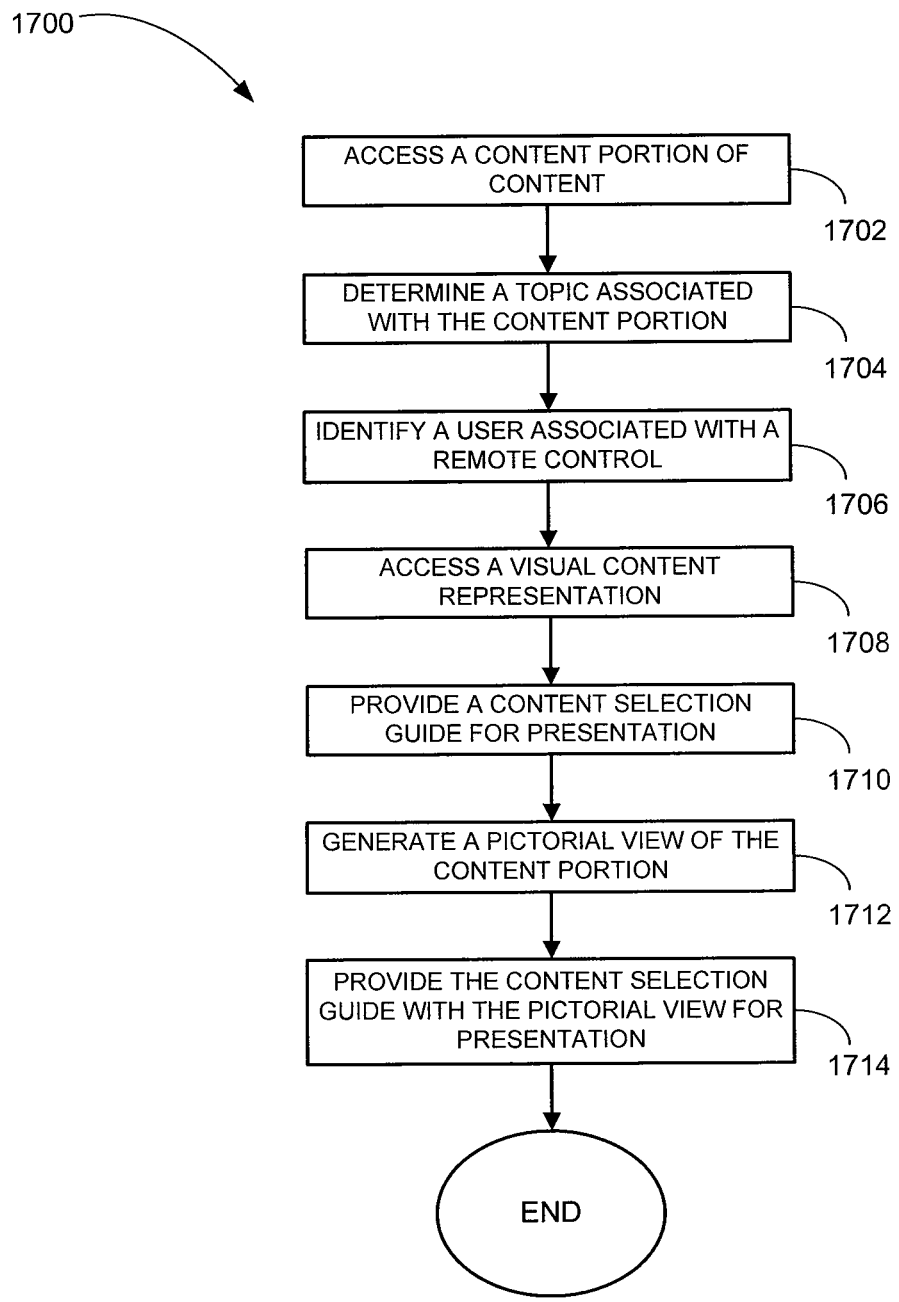
FIG. 17 is a flowchart illustrating a method for content selection guide presentation in accordance with an example embodiment.

FIG. 17 illustrates a method 1700 for content selection guide presentation according to an example embodiment. The method 1700 may be performed by the display device 106.1, the receiver device 108, and/or the remote control device 112 of the content system 100 (see FIG. 1) or otherwise performed.

A content portion of content is accessed at block 1702. The content portion may be a component, a segment, or a content signal. The content portion may be received over the provider network 104 from the content source 102, accessed from storage, or otherwise accessed.

A topic associated with the content portion is identified at block 1704. A user associated with a remote control device may be identified at block 1706.

At block 1708, a visual content representation associated with the content portion of the content is accessed in accordance with the identification of the topic. The visual content representation may include a pictorial view associated with a past content portion.

In an example embodiment, the visual content representation may be accessed in accordance with the determining of the topic and the user associated with the remote control device.

The visual content representation of the content portion may be generated from the content portion, accessed from storage, or otherwise accessed. The visual content representation may include a textual description and/or a pictorial view.

A content selection guide including the visual content representation of the content portion is provided for presentation at block 1710.

A pictorial view of the content portion of the content may be generated at block 1712. At block 1714, the content selection guide may be presented including the pictorial view of the content portion in place of the visual content representation of the content.

Figure 18:
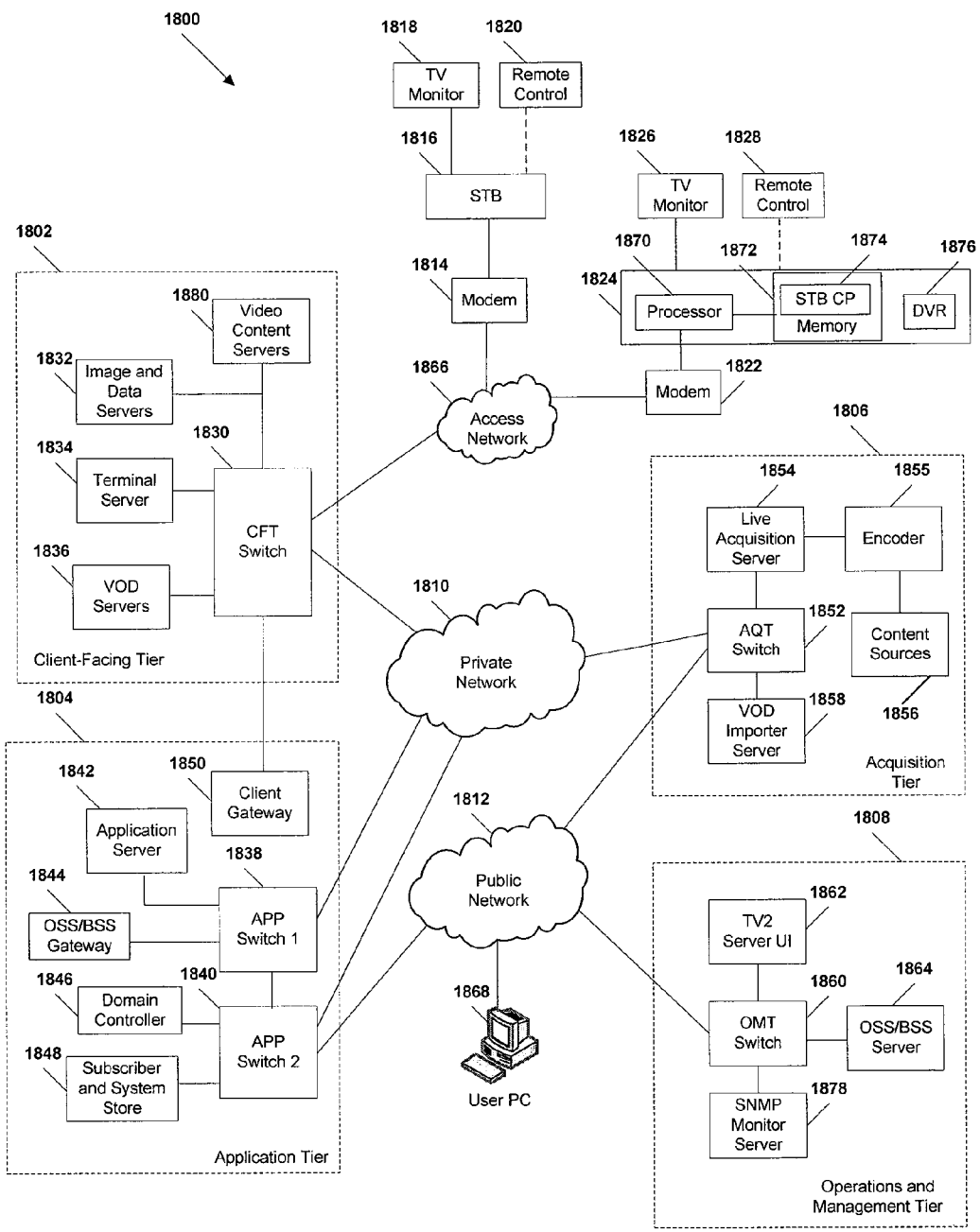
FIG. 18 is a block diagram of an IPTV system in which the content system of FIGS. 1A and 1B may be deployed in accordance with an example embodiment.

FIG. 18 illustrates an example embodiment of an Internet Protocol Television (IPTV) system 1800 in which the content system 100 may be deployed. However, the content system 100 may be deployed in other types of IPTV and non-IPTV video systems.

The system 1800 as illustrated may include a client facing tier 1802, an application tier 1804, an acquisition tier 1806, and an operations and management tier 1808. Some tiers 1802, 1804, 1806, 1808 may be coupled to a private network 1810; to a public network 1812, such as the Internet; or to both the private network 1810 and the public network 1812. For example, the client-facing tier 1802 may be coupled to the private network 1810. Further, the application tier 1804 may be coupled to the private network 1810 and to the public network 1812. The acquisition tier 1806 may also be coupled to the private network 1810 and to the public network 1812. Additionally, the operations and management tier 1808 may be coupled to the public network 1812.

As illustrated in FIG. 18, some of the various tiers 1802, 1804, 1806, 1808 may communicate with each other via the private network 1810 and the public network 1812. For instance, the client-facing tier 1802 may communicate with the application tier 1804 and the acquisition tier 1806 via the private network 1810. The application tier 1804 may also communicate with the acquisition tier 1806 via the private network 1810. Further, the application tier 1804 may communicate with the acquisition tier 1806 and the operations and management tier 1808 via the public network 1812. Moreover, the acquisition tier 1806 may communicate with the operations and management tier 1808 via the public network 1812.

As illustrated in FIG. 18, the client-facing tier 1802 may communicate with user equipment via a private access network 1866 (e.g., the provider network 104 of FIG. 1), such as an Internet Protocol Television (IPTV) access network. In an illustrative embodiment, modems, such as a first modem 1814 and a second modem 1822 may be coupled to the private access network 1866. The client-facing tier 1802 may communicate with a first representative set-top box device 1816 via the first modem 1814 and with a second representative set-top box device 1824 via the second modem 1822. The client-facing tier 1802 may communicate with a large number of set-top boxes, such as the representative set-top boxes 1816, 1824, (e.g., the receiver device 108 of FIG. 1) over a wide geographic area, such as a regional area, a metropolitan area, a viewing area, a designated market area or any other suitable geographic area, market area, or subscriber or customer group that may be supported by networking the client-facing tier 1802 to numerous set-top box devices. In an illustrative embodiment, the client-facing tier, or any portion thereof, may be included at a video head-end office.

In a particular embodiment, the client-facing tier 1802 may be coupled to the modems 1814, 1822 via fiber optic cables. Alternatively, the modems 1814 and 1822 may be digital subscriber line (DSL) modems that are coupled to one or more network nodes via twisted pairs, and the client-facing tier 1802 may be coupled to the network nodes via fiber-optic cables. Each set-top box device 1816, 1824 may process data received via the private access network 1866, via an IPTV software platform, such as Microsoft® TV IPTV Edition. In another embodiment, representative set-top boxes 1816, 1824 may receive data from private access network 1866 through RF and other cable and/or satellite based networks.

Additionally, the first set-top box device 1816 may be coupled to a first external display device, such as a first television monitor 1818, and the second set-top box device 1824 may be coupled to a second external display device, such as a second television monitor 1826. Moreover, the first set-top box device 1816 may communicate with a first remote control 1820, and the second set-top box device may communicate with a second remote control 1828.

In an example, non-limiting embodiment, one or more of set-top box devices 1816, 1824 may receive video content, which may include video and audio portions, from the client-facing tier 1802 via the private access network 1866. The set-top boxes 1816, 1824 may transmit the video content to an external display device, such as the television monitors 1818, 1826. Further, some of the set-top box devices 1816, 1824 may include a STB processor, such as STB processor 1870, and a STB memory device, such as STB memory 1872, which is accessible to the STB processor 1870. In one embodiment, a computer program, such as the STB computer program 1874, may be embedded within the STB memory device 1872. Some set-top box devices 1816, 1824 may also include a video content storage module, such as a digital video recorder (DVR) 1876. In a particular embodiment, the set-top box devices 1816, 1824 may communicate commands received from the remote control devices 1820, 1828 to the client-facing tier 1802 via the private access network 1866.

In an illustrative embodiment, the client-facing tier 1802 may include a client-facing tier (CFT) switch 1830 that manages communication between the client-facing tier 1802 and the private access network 1866 and between the client-facing tier 1802 and the private network 1810. As shown, the CFT switch 1830 is coupled to one or more image and data servers 1832 that store still images associated with programs of various IPTV channels. The image and data servers 1832 may also store data related to various channels, e.g., types of data related to the channels and to programs or video content displayed via the channels. In an illustrative embodiment, the image and data servers 1832 may be a cluster of servers, some of which may store still images, channel and program-related data, or any combination thereof. The CFT switch 1830 may also be coupled to a terminal server 1834 that provides terminal devices with a connection point to the private network 1810. In a particular embodiment, the CFT switch 1830 may also be coupled to one or more video-on-demand (VOD) servers 1836 that store or provide VOD content imported by the IPTV system 1800. In an illustrative, non-limiting embodiment, the VOD content servers 1880 may include one or more unicast servers.

The client-facing tier 1802 may also include one or more video content servers 1880 that transmit video content requested by viewers via their set-top boxes 1816, 1824. In an illustrative, non-limiting embodiment, the video content servers 1880 may include one or more multicast servers.

As illustrated in FIG. 18, the application tier 1804 may communicate with both the private network 1810 and the public network 1812. The application tier 1804 may include a first application tier (APP) switch 1838 and a second APP switch 1840. In a particular embodiment, the first APP switch 1838 may be coupled to the second APP switch 1840. The first APP switch 1838 may be coupled to an application server 1842 and to an OSS/BSS gateway 1844. In a particular embodiment, the application server 1842 may provide applications to the set-top box devices 1816, 1824 via the private access network 1866, which enable the set-top box devices 1816, 1824 to provide functions, such as display, messaging, processing of IPTV data and VOD material, etc. In a particular embodiment, the OSS/BSS gateway 1844 includes operation systems and support (OSS) data, as well as billing systems and support (BSS) data. In one embodiment, the OSS/BSS gateway may provide or restrict access to an OSS/BSS server 1864 that stores operations and billing systems data.

Further, the second APP switch 1840 may be coupled to a domain controller 1846 that provides web access, for example, to users via the public network 1812. For example, the domain controller 1846 may provide remote web access to IPTV account information via the public network 1812, which users may access using their personal computers 1868. The second APP switch 1840 may be coupled to a subscriber and system store 1848 that includes account information, such as account information that is associated with users who access the system 1800 via the private network 1810 or the public network 1812. In a particular embodiment, the application tier 1804 may also include a client gateway 1850 that communicates data directly with the client-facing tier 1802. In this embodiment, the client gateway 1850 may be coupled directly to the CFT switch 1830. The client gateway 1850 may provide user access to the private network 1810 and the tiers coupled thereto.

In a particular embodiment, the set-top box devices 1816, 1824 may access the IPTV system 1800 via the private access network 1866, using information received from the client gateway 1850. In this embodiment, the private access network 1866 may provide security for the private network 1810. User devices may access the client gateway 1850 via the private access network 1866, and the client gateway 1850 may allow such devices to access the private network 1810 once the devices are authenticated or verified. Similarly, the client gateway 1850 may prevent unauthorized devices, such as hacker computers or stolen set-top box devices from accessing the private network 1810, by denying access to these devices beyond the private access network 1866.

For example, when the first representative set-top box device 1816 accesses the system 1800 via the private access network 1866, the client gateway 1850 may verify subscriber information by communicating with the subscriber and system store 1848 via the private network 1810, the first APP switch 1838, and the second APP switch 1840. Further, the client gateway 1850 may verify billing information and status by communicating with the OSS/BSS gateway 1844 via the private network 1810 and the first APP switch 1838. In one embodiment, the OSS/BSS gateway 1844 may transmit a query across the first APP switch 1838, to the second APP switch 1840, and the second APP switch 1840 may communicate the query across the public network 1812 to the OSS/BSS server 1864. After the client gateway 1850 confirms subscriber and/or billing information, the client gateway 1850 may allow the set-top box device 1816 access to IPTV content and VOD content. If the client gateway 1850 is unable to verify subscriber information for the set-top box device 1816, e.g., because it is connected to an unauthorized twisted pair, the client gateway 1850 may block transmissions to and from the set-top box device 1816 beyond the private access network 1866.

As indicated in FIG. 18, the acquisition tier 1806 includes an acquisition tier (AQT) switch 1852 that communicates with the private network 1810. The AQT switch 1852 may also communicate with the operations and management tier 1808 via the public network 1812. In a particular embodiment, the AQT switch 1852 may be coupled to a live acquisition server 1854 that receives television or movie content, for example, from content sources 1856 through an encoder 1855. In a particular embodiment during operation of the IPTV system, the live acquisition server 1854 may acquire television or movie content. The live acquisition server 1854 may transmit the television or movie content to the AQT switch 1852 and the AQT switch 1852 may transmit the television or movie content to the CFT switch 1830 via the private network 1810.

Further, the television or movie content may be transmitted to the video content servers 1880, where it may be encoded, formatted, stored, or otherwise manipulated and prepared for communication to the set-top box devices 1816, 1824. The CFT switch 1830 may communicate the television or movie content to the modems 1814, 1822 via the private access network 1866. The set-top box devices 1816, 1824 may receive the television or movie content via the modems 1814, 1822, and may transmit the television or movie content to the television monitors 1818, 1826. In an illustrative embodiment, video or audio portions of the television or movie content may be streamed to the set-top box devices 1816, 1824.

Further, the AQT switch may be coupled to a video-on-demand importer server 1858 that stores television or movie content received at the acquisition tier 1806 and communicates the stored content to the VOD server 1836 at the client-facing tier 1802 via the private network 1810. Additionally, at the acquisition tier 1806, the video-on-demand (VOD) importer server 1858 may receive content from one or more VOD sources outside the IPTV system 1800, such as movie studios and programmers of non-live content. The VOD importer server 1858 may transmit the VOD content to the AQT switch 1852, and the AQT switch 1852, in turn, may communicate the material to the CFT switch 1830 via the private network 1810. The VOD content may be stored at one or more servers, such as the VOD server 1836.

When user issue requests for VOD content via the set-top box devices 1816, 1824, the requests may be transmitted over the private access network 1866 to the VOD server 1836, via the CFT switch 1830. Upon receiving such requests, the VOD server 1836 may retrieve the requested VOD content and transmit the content to the set-top box devices 1816, 1824 across the private access network 1866, via the CFT switch 1830. The set-top box devices 1816, 1824 may transmit the VOD content to the television monitors 1818, 1826. In an illustrative embodiment, video or audio portions of VOD content may be streamed to the set-top box devices 1816, 1824.

FIG. 18 further illustrates that the operations and management tier 1808 may include an operations and management tier (OMT) switch 1860 that conducts communication between the operations and management tier 1808 and the public network 1812. In the embodiment illustrated by FIG. 18, the OMT switch 1860 is coupled to a TV2 server 1862. Additionally, the OMT switch 1860 may be coupled to an OSS/BSS server 1864 and to a simple network management protocol (SNMP) monitor 1878 that monitors network devices within or coupled to the IPTV system 1800. In a particular embodiment, the OMT switch 1860 may communicate with the AQT switch 1852 via the public network 1812.

In an illustrative embodiment, the live acquisition server 1854 may transmit the television or movie content to the AQT switch 1852, and the AQT switch 1852, in turn, may transmit the television or movie content to the OMT switch 1860 via the public network 1812. In this embodiment, the OMT switch 1860 may transmit the television or movie content to the TV2 server 1862 for display to users accessing the user interface at the TV2 server 1862. For example, a user may access the TV2 server 1862 using a personal computer (PC) 1868 coupled to the public network 1812.

Figure 19:
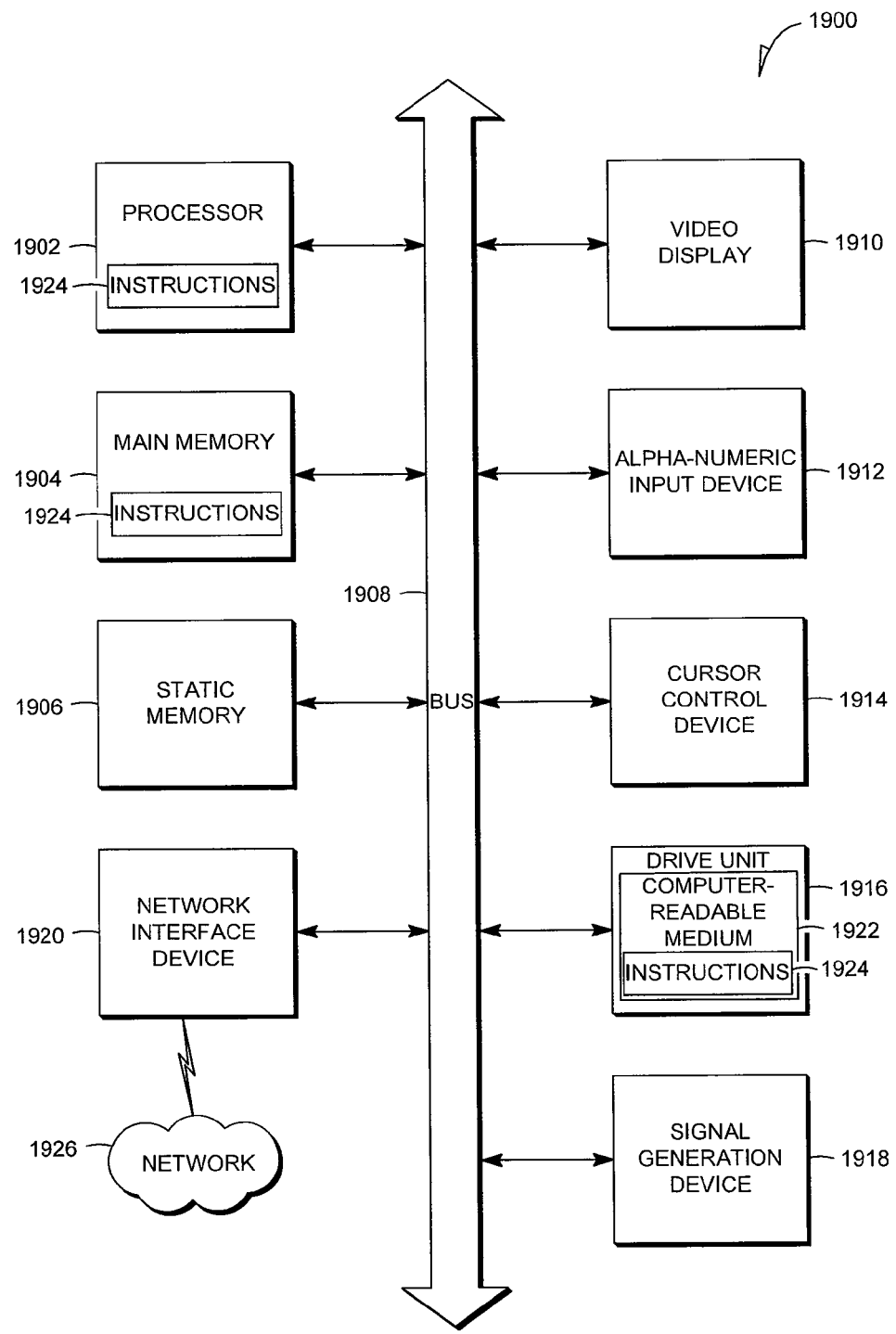
FIG. 19 illustrates a diagrammatic representation of a machine in the example form of a computer system within which a set of instructions for causing the machine to perform any one or more of the methodologies discussed herein may be executed.

FIG. 19 shows a diagrammatic representation of a machine in the example form of a computer system 1900 within which a set of instructions may be executed causing the machine to perform any one or more of the methods, processes, operations, or methodologies discussed herein. The information source 116 and/or the content source 102 may be deployed on the computer system 1900. The display device 106.1, 106.2, the receiver device 108, the remote control device 112, and/or the network apparatus 152 may include the functionality of the computer system 1900.

In an example embodiment, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a server computer, a client computer, a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1900 includes a processor 1902 (e.g., a central processing unit (CPU) a graphics processing unit (GPU) or both), a main memory 1904 and a static memory 1906, which communicate with each other via a bus 1908. The computer system 1900 may further include a video display unit 1910 (e.g., a liquid crystal display (LCD) or a cathode ray tube (CRT)). The computer system 1900 also includes an alphanumeric input device 1912 (e.g., a keyboard), a cursor control device 1914 (e.g., a mouse), a drive unit 1916, a signal generation device 1918 (e.g., a speaker) and a network interface device 1920.

The drive unit 1916 includes a machine-readable medium 1922 on which is stored one or more sets of instructions (e.g., software 1924) embodying any one or more of the methodologies or functions described herein. The software 1924 may also reside, completely or at least partially, within the main memory 1904 and/or within the processor 1902 during execution thereof by the computer system 1900, the main memory 1904 and the processor 1902 also constituting machine-readable media.

The software 1924 may further be transmitted or received over a network 1926 via the network interface device 1920.

While the machine-readable medium 1922 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies shown in the various embodiments of the present invention. The term "machine-readable medium" shall accordingly be taken to include, but not be limited to, solid-state memories, optical and magnetic media, and carrier wave signals.

Certain systems, apparatus, applications or processes are described herein as including a number of modules or mechanisms. A module or a mechanism may be a unit of distinct functionality that can provide information to, and receive information from, other modules. Accordingly, the described modules may be regarded as being communicatively coupled. Modules may also initiate communication with input or output devices, and can operate on a resource (e.g., a collection of information). The modules be implemented as hardware circuitry, optical components, single or multi-processor circuits, memory circuits, software program modules and objects, firmware, and combinations thereof, as appropriate for particular implementations of various embodiments.

Thus, methods and systems for content recording and indexing have been described. Although the present invention has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A method comprising:
    accessing, by a system comprising a processor, content from a content source, the content comprising video content and wherein the system is a receiver device;
    generating, by the system, metadata for the content according to a remote control device;
    processing, by the system, the content to generate an index of the content;
    accessing, by the system, programming data for the content from a database;
    generating, by the system, a pictorial view of the content, wherein the pictorial view is generated at a quality based on a capability of the remote control device;

generating, by the system, a content selection guide in accordance with the index, the metadata, and the programming data, the content selection guide being generated for presentation at a display device of the remote control device, the content selection guide including a listing of the content and the programming scheduled for future broadcast, wherein the content selection guide has access to multiple media streams for obtaining the content and the programming scheduled for future broadcast, and wherein the remote control device is configured to communicate with a set top box for controlling presentation by the set top box of the content and the programming scheduled for future broadcast;

providing, by the system, the content selection guide and the pictorial view of the content to the remote control device;

receiving, by the system, a content viewing selection from the remote control device;

receiving, by the system, a first content portion and first metadata associated with the first content portion from the content source according to the content viewing selection;

adding, by the system, the first metadata to stored metadata;

analyzing, by the system, the stored metadata to determine a content viewing profile;

ranking, by the system, the first content portion according to the content viewing profile to generate a first content ranking;

providing, by the system, the first content ranking to the remote control device;

receiving, by the system, a search request from the remote control device;

searching, by the system, the index of the content, the programming data, and the metadata for a segment of the content in accordance with the search request;

providing, by the system, a search result from the searching for presentation at the remote control device;

providing, by the system, a topic description for the segment of the content with the search result provided for presentation;

differentiating, by the system, a portion of the topic description provided for presentation that includes the search request;

receiving, by the system, a topic match selection from the portion of the topic description; and providing, by the system, the segment of the content that is associated with the topic match selection for presentation.

2. The method of claim 1, further comprising:
determining, by the system, whether to provide the index to the remote control device; and
providing, by the system, the index to the remote control device according to the determining to provide the index.

3. The method of claim 1, wherein the pictorial view is generated in response to a request for the pictorial view from the remote control device.

4. The method of claim 1, wherein the content is accessed from a local content source.

5. The method of claim 1, further comprising:
receiving, by the system, a second search request and a time range for a topic;
searching, by the system, the content selection guide for a topic match in accordance with the second search request and the time range; and
providing, by the system, the topic match for presentation.

6. The method of claim 1, wherein the listing comprises program text identifying a program of the content.

7. A method comprising:
identifying, by a system comprising a processor, an advertisement associated with received content, wherein the content comprises video content and wherein the system comprises a receiver device;

obtaining, by the system, programming schedule data from a database according to the advertisement;

generating, by the system, metadata for the content according to a remote control device;

generating, by the system, a pictorial view of the content, wherein the pictorial view is generated at a quality based on a capability of the remote control device;

generating, by the system, a content selection guide in accordance with the program programming schedule data and the metadata;

providing, by the system, the content selection guide and the pictorial view of the content to the remote control device;

presenting, by the system, a listing portion of a content selection guide on a display device of a remote control device, the listing portion being associated with the content and the programming scheduling data, the listing portion being generated by the remote control device;

receiving, by the system, a hierarchical navigation selection for the listing portion;

providing, by the system, a different listing portion of the content selection guide in accordance with the hierarchical navigation selection for presentation on the display device of the remote control device, wherein the remote control device is configured to communicate with a set top box for controlling presentation of media content by the set top box;

receiving, by the system, a content viewing selection from the remote control device;

receiving, by the system, a first content portion and first metadata associated with the first content portion from a content source according to the content viewing selection;

adding, by the system, the first metadata to stored metadata;

analyzing, by the system, the stored metadata to determine a content viewing profile;

ranking, by the system, the first content portion according to the content viewing profile to generate a first content ranking;

providing, by the system, the first content ranking to the remote control device;

receiving, by the system, a search request from the remote control device;

searching, by the system, the content, the programming data, and the metadata for a segment of the content in accordance with the search request;

providing, by the system, a search result from the searching for presentation at the remote control device;

providing, by the system, a topic description for the segment of the content with the search result provided for presentation;

differentiating, by the system, a portion of the topic description provided for presentation that includes the search request;

receiving, by the system, a topic match selection from the portion of the topic description; and providing, by the system, the segment of the content that is associated with the topic match selection for presentation.

8. The method of claim 7, further comprising:
generating, by the system, an index according to the content;
determining, by the system, whether to provide the index to the remote control device; and
providing, by the system, the index to the remote control device according to the determining to provide the index.

9. The method of claim 7, wherein the different listing portion comprises a uniform resource location associated with the content.

10. A method comprising:
accessing, by a system comprising a processor, a content portion of first content stored in a memory device, wherein the first content comprises video content;
generating, by the system, an index for the content portion;
obtaining, by the system, schedule data associated with a future broadcast from a database according to an advertisement associated with the first content;
accessing, by the system, a visual content representation associated with the content portion of the first content;
determining, by the system, programming scheduled for the future broadcast according to the schedule data;
generating, by the system, metadata for the first content according to a remote control device;
generating, by the system, a pictorial view of the first content, wherein the pictorial view is generated at a quality based on a capability of the remote control device;
generating, by the system, a content selection guide based on the index, the metadata, and the programming schedule using the processor of the remote control device;
providing, by the system, the content selection guide and the pictorial view of the first content for presentation on a display device of the remote control device, wherein the remote control device is configured to communicate with a set top box for controlling presentation of media content by the set top box;
receiving, by the system, a content viewing selection from the remote control device;
receiving, by the system, a first content portion and first metadata associated with the first content portion from a content source according to the content viewing selection;
adding, by the system, the first metadata to stored metadata;
analyzing, by the system, the stored metadata to determine a content viewing profile;
ranking, by the system, the first content portion according to the content viewing profile to generate a first content ranking;
providing, by the system, the first content ranking to the remote control device;
receiving, by the system, a search request from the remote control device;
searching, by the system, the index of the content, the programming data, and the metadata for a segment of the content in accordance with the search request;
providing, by the system, a search result from the searching for presentation at the remote control device;
providing, by the system, a topic description for the segment of the content with the search result provided for presentation;
differentiating, by the system, a portion of the topic description provided for presentation that includes the search request;
receiving, by the system, a topic match selection from the portion of the topic description; and
providing, by the system, the segment of the content that is associated with the topic match selection for presentation.

11. The method of claim 10, further comprising:
identifying, by the system, a user associated with the remote control device;
wherein the visual content representation is accessed in accordance with the identifying the user associated with the remote control device, and
wherein the content selection guide has access to multiple streams of content.

12. The method of claim 10, wherein the content selection guide has access to multiple streams of media content simultaneously.

13. The method of claim 10, wherein the pictorial view is generated in response to a request for the pictorial view.

14. The method of claim 10, wherein the visual content representation includes a textual description, a pictorial view, or combinations thereof.

15. A non-transitory machine-readable medium comprising instructions, which when executed by a processor, causes the processor to perform operations comprising:
accessing content from a content source, the content comprising video content;
processing the content to generate an index of the content;
accessing programming data for content from a database;
generating metadata for the content according to a remote control device;
generating a pictorial view of the content, wherein the pictorial view is generated at a quality based on a capability of the remote control device;
generating a content selection guide in accordance with the index, the metadata, and the programming data for presentation at a display device of the remote control device, the content selection guide including a listing of the content and the programming scheduled for future broadcast, wherein the content selection guide has access to multiple media streams to obtain the content and the programming scheduled for future broadcast, wherein the remote control device is configured to communicate with a set top box for controlling presentation by the set top box of the content and the programming scheduled for future broadcast;
providing the content selection guide and the pictorial view of the content to the remote control device;
receiving a content viewing selection from the remote control device;
receiving a first content portion and first metadata associated with the first content portion from the content source according to the content viewing selection;
adding the first metadata to stored metadata;
analyzing the stored metadata to determine a content viewing profile;
ranking the first content portion according to the content viewing profile to generate a first content ranking;
providing the first content ranking to the remote control device;
receiving a search request from the remote control device;
searching the index of the content, the programming data, and the metadata for a segment of the content in accordance with the search request;
providing a search result from the searching for presentation at the remote control device;
providing a topic description for the segment of the content with the search result provided for presentation;

differentiating a portion of the topic description provided for presentation that includes the search request;

receiving a topic match selection from the portion of the topic description; and providing the segment of the content that is associated with the topic match selection for presentation.

16. The non-transitory machine-readable medium of claim 15 further comprising instructions, which when executed by the processor cause the processor to perform operations comprising providing the index to another device on a network, wherein the content selection guide has access to the multiple media streams simultaneously.

\* \* \* \* \*